US011441610B2

(12) United States Patent
Feichter et al.

(10) Patent No.: US 11,441,610 B2
(45) Date of Patent: Sep. 13, 2022

(54) QUICK CONNECT ASSEMBLY AND RETAINING MEMBER FOR USE THEREIN

(71) Applicant: DANA AUTOMOTIVE SYSTEMS GROUP, LLC, Maumee, OH (US)

(72) Inventors: Marc T. Feichter, Perrysburg, OH (US); Michael J. Horvath, Waterville, OH (US); Bao T. Luong, Lambertville, MI (US); Michael J. Scharf, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 356 days.

(21) Appl. No.: 16/622,965

(22) PCT Filed: Jul. 6, 2018

(86) PCT No.: PCT/US2018/041037
§ 371 (c)(1),
(2) Date: Dec. 16, 2019

(87) PCT Pub. No.: WO2019/010382
PCT Pub. Date: Jan. 10, 2019

(65) Prior Publication Data
US 2021/0148411 A1    May 20, 2021

Related U.S. Application Data

(60) Provisional application No. 62/631,080, filed on Feb. 15, 2018, provisional application No. 62/529,527, filed on Jul. 7, 2017.

(51) Int. Cl.
*F16D 1/116* (2006.01)
*F16B 21/18* (2006.01)
*F16D 1/10* (2006.01)

(52) U.S. Cl.
CPC .............. *F16D 1/116* (2013.01); *F16B 21/18* (2013.01); *F16D 2001/103* (2013.01); *Y10T 403/7033* (2015.01)

(58) Field of Classification Search
CPC ...... F16B 21/18; F16B 21/183; F16B 21/186; F16D 1/116; F16D 3/387; F16D 2001/103; Y10T 403/7033
(Continued)

(56) References Cited

U.S. PATENT DOCUMENTS 3,009,722 A    11/1961  Augustin
3,460,427 A     8/1969  Baumgarten
(Continued)

FOREIGN PATENT DOCUMENTS

| DE | 102014203400 | 8/2015 |
| DE | 102015213731 | 1/2017 |
| DE | 202017102584 | 5/2017 |

OTHER PUBLICATIONS

Eaton Corporation, Eaton, The Ringmaster, Materials and Finishes, Cover and p. 3, Jul. 1996, United States of America.
(Continued)

*Primary Examiner* — Josh Skroupa
(74) *Attorney, Agent, or Firm* — Marshall & Melhorn, LLC

(57) ABSTRACT

A quick connect assembly and a retaining member for use in a vehicle. The quick connect assembly includes a first splined member (712) drivingly connected to at least a portion of a second splined member (740). Circumferentially extending along at least a portion of an inner surface (718) of the first splined member is a first splined member retaining member groove (738). The second splined member includes a second splined member retaining member groove (758) circumferentially extending along at least a portion of
(Continued)

an outer surface of the second splined member. The second splined member retaining member groove in the second splined member is complementary to and aligned with the first splined member retaining member groove in the first splined member. At least a portion of a retaining member (760) is received and/or retained within at least a portion of the first and second splined member retaining member grooves in the first and second splined members.

20 Claims, 7 Drawing Sheets

(58) Field of Classification Search
USPC .......................................... 403/359.5; 464/182
See application file for complete search history.

(56) References Cited

U.S. PATENT DOCUMENTS

| | | | |
|---|---|---|---|
| 3,830,477 A * | 8/1974 | Buchsteiner | ............ F16B 21/18 267/161 |
| 3,992,117 A | 11/1976 | Ristau | |
| 4,124,318 A | 11/1978 | Sagady | |
| 4,580,996 A | 4/1986 | Brissette | |
| 5,176,413 A | 1/1993 | Westman | |
| 5,352,079 A | 10/1994 | Croskey | |
| 5,937,985 A | 8/1999 | Dover | |
| 6,183,370 B1 | 2/2001 | Lim | |
| 6,241,616 B1 | 6/2001 | Lightcap | |
| 6,582,151 B2 | 6/2003 | Hopson | |
| 7,314,416 B2 | 1/2008 | Loughrin | |
| 7,507,161 B2 | 3/2009 | Worman, Jr. | |
| 7,614,818 B2 | 11/2009 | Inaki | |
| 7,677,984 B2 | 3/2010 | Hahn | |
| 7,810,816 B1 | 10/2010 | Halling | |
| 7,946,374 B2 | 5/2011 | Kofuji | |
| 8,025,454 B2 | 9/2011 | Cermak | |
| 8,104,769 B2 * | 1/2012 | Halling | ................... E21B 33/04 277/342 |
| 8,262,490 B2 | 9/2012 | Langer | |
| 8,277,330 B2 | 10/2012 | Szentmihalyi | |
| 8,308,577 B2 | 11/2012 | Braun | |
| 8,425,141 B2 | 4/2013 | Disser | |
| 8,425,142 B2 * | 4/2013 | Disser | ..................... F16D 1/116 403/359.5 |
| 8,434,582 B2 | 5/2013 | Bjoerck | |
| 8,864,590 B2 | 10/2014 | Sugiyama | |
| 8,864,591 B2 | 10/2014 | Sugiyama | |
| 9,097,287 B2 | 8/2015 | Dine | |
| 9,267,549 B2 | 2/2016 | Dine | |
| 9,395,019 B2 * | 7/2016 | Cunningham | .......... F16K 3/246 |
| 10,138,943 B2 * | 11/2018 | Kraus | ..................... F16D 1/116 |
| 2014/0023459 A1 * | 1/2014 | Ayad | ..................... F16B 21/186 411/517 |
| 2015/0247604 A1 | 9/2015 | Mckinzie | |
| 2018/0003240 A1 | 1/2018 | Sugiyama | |

OTHER PUBLICATIONS

European Patent Office, International Search Report with Written Opinion issued in PCT/US2018/041037, dated Oct. 2, 2018, 11 pages, Rijswijk Netherlands.

* cited by examiner

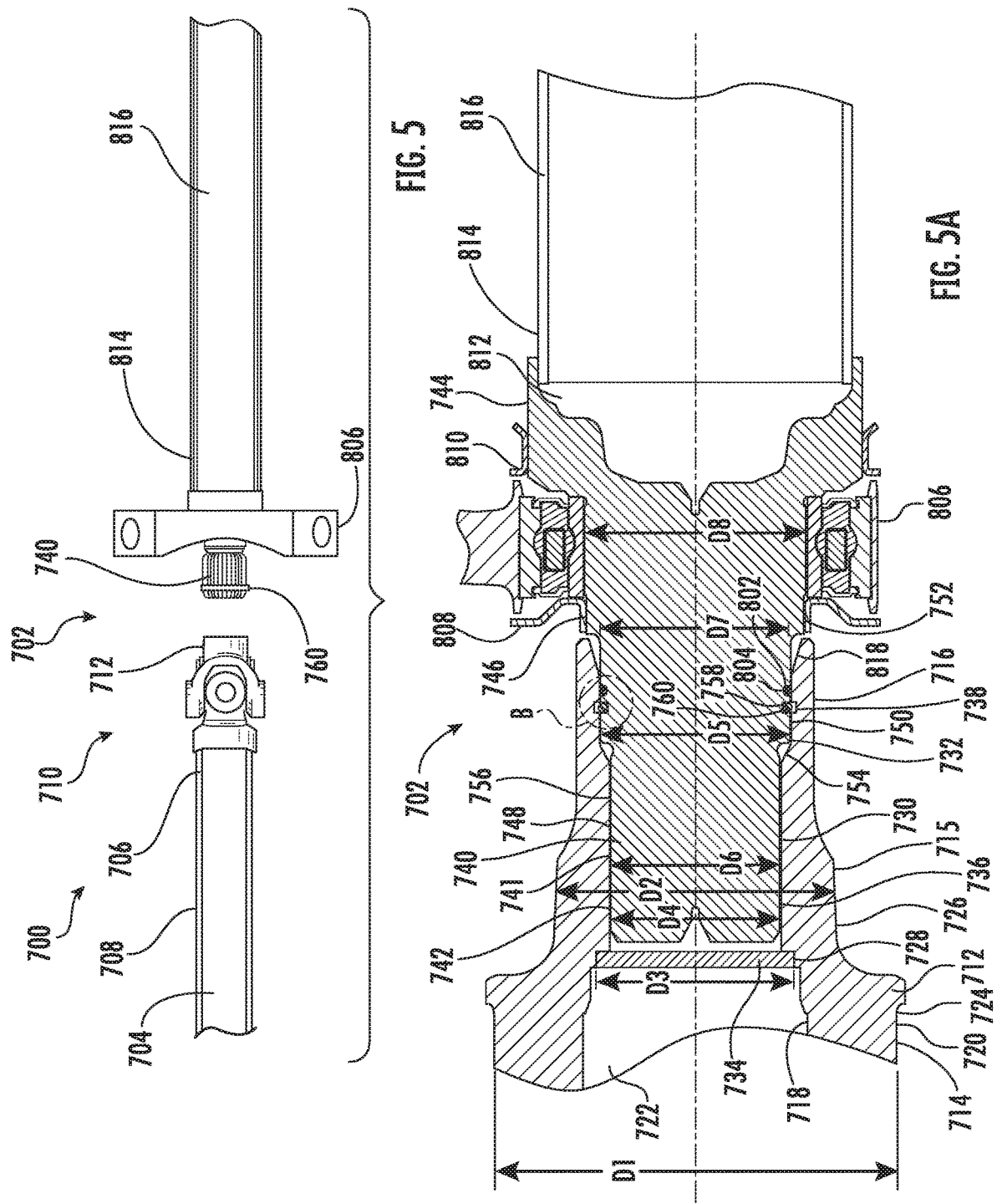

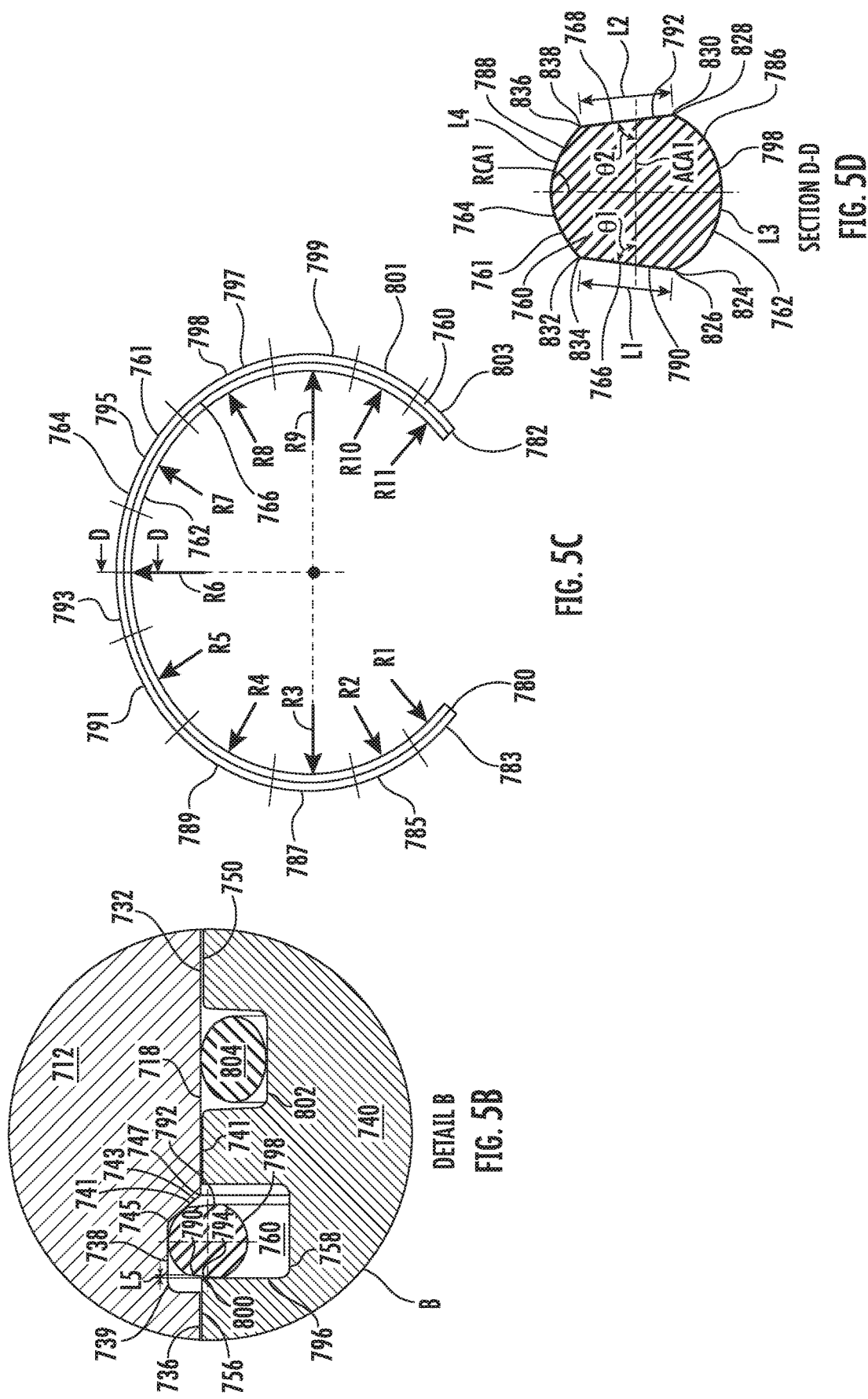

SECTION E-E

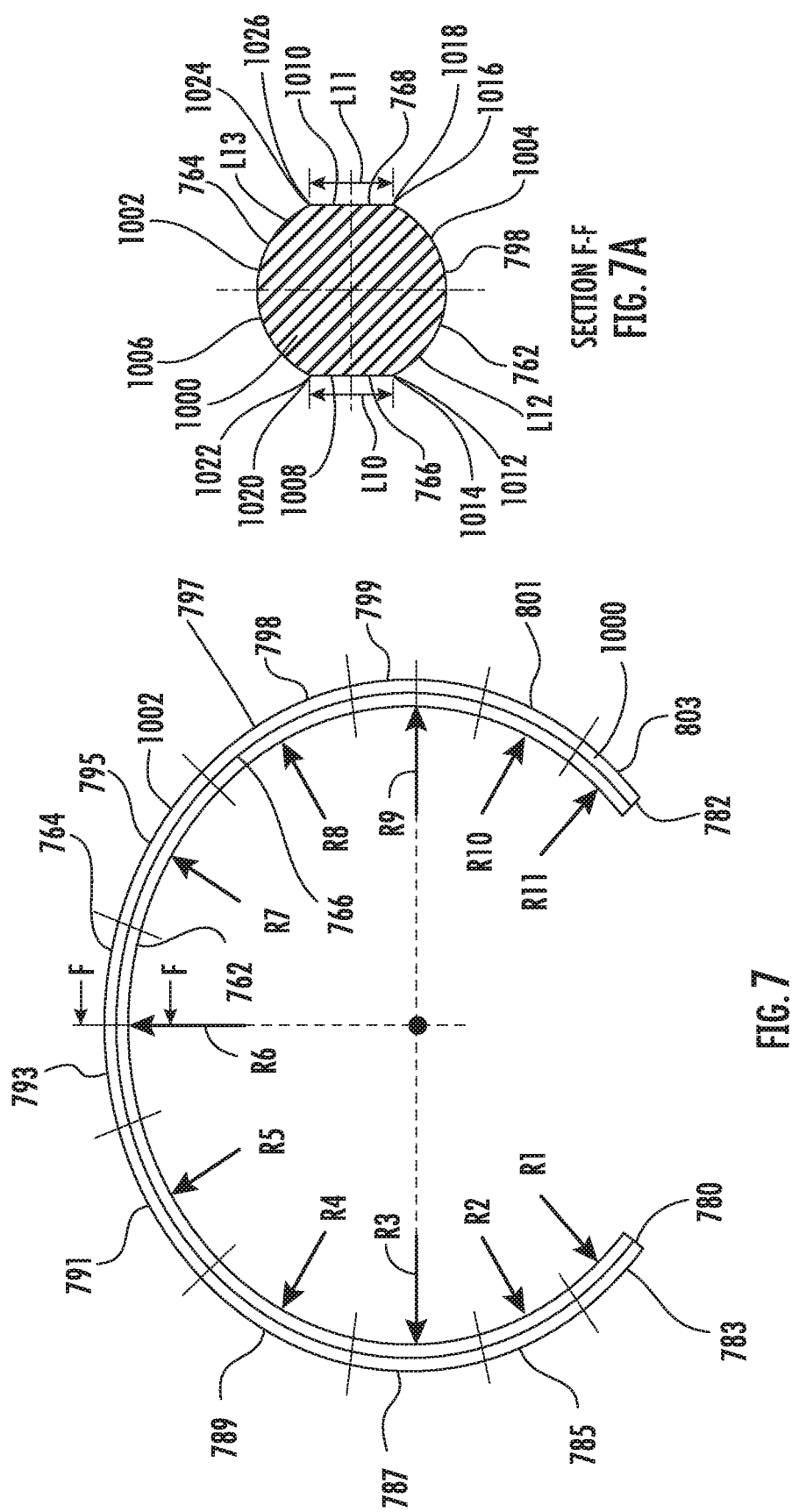

QUICK CONNECT ASSEMBLY AND RETAINING MEMBER FOR USE THEREIN

CROSS-REFERENCE TO RELATED APPLICATIONS

The present application claims the benefit to U.S. Provisional Patent Application No. 62/529,527 filed on Jul. 7, 2017, and U.S. Provisional Patent Application No. 62/631,080 filed on Feb. 15, 2018, which are incorporated herein by reference in their entirety.

FIELD OF THE DISCLOSURE

The present disclosure relates to a quick connect assembly and a retaining member for axially securing a first splined member to a second splined member of the quick connect assembly.

BACKGROUND OF THE DISCLOSURE

A vehicle drive-line is used to transmit an amount of rotational power generated by a source of rotational energy, such as but not limited to an engine, to one or more wheels of the vehicle. Given the different heights of the various components of the vehicle drive-line, one or more joint assemblies may be used. Additionally, the one or more joint assemblies of the vehicle drive-line allow for the transfer of an amount of rotational power from one drive-line component to another where one or both of the drive-line components have a variable height.

In order to connect the ends of the drive-line components to the ends of the one or more joint assemblies, a male splined member is meshingly engaged with a female splined member. Typically, snap-rings are used in order to axially restrain the male splined member to the female splined member. Conventional snap-rings have a circular cross-sectional shape. During dis-assembly of the male splined member from the female splined member, the conventional circular snap-ring "binds-up" with a portion of a snap-ring groove in the male splined member thereby preventing the snap-ring from fully retracting within the snap-ring groove. This prevents the male splined member from being dis-assembled of the female splined member which prevents the various driveline components of the vehicle drive-line from being serviced and/or replaced by service personnel. In order to overcome this problem, one or more expensive fasteners or welds are typically used which increases the overall costs associated with the drive-line of the vehicle and makes assembly and dis-assembly more difficult.

It would therefore be advantageous to provide a quick connect assembly that is easily assembled, easily dis-assembled and is cost efficient. Additionally, it would be advantageous to provide a snap-ring that will facilitate the easy assembly and dis-assembly of the quick connect assembly.

SUMMARY OF THE DISCLOSURE

A quick connect assembly for use in a vehicle. The quick connect assembly includes a first splined member drivingly connected to at least a portion of a second splined member. Circumferentially extending along at least a portion of an inner surface of the first splined member is a first splined member retaining member groove. The second splined member includes a second splined member retaining member groove circumferentially extending along at least a portion of an outer surface of the second splined member. The second splined member retaining member groove in the second splined member is complementary to and aligned with the first splined member retaining member groove in the first splined member. At least a portion of a retaining member is received and/or retained within at least a portion of the first and second splined member retaining member grooves in the first and second splined members of the quick connect assembly.

According to an aspect of the disclosure, the first splined member of the quick connect assembly may further include a first receiving portion circumferentially extending along at least a portion of the inner surface of the intermediate portion of the first splined member.

According to any of the previous aspects of the disclosure, the first receiving portion in the inner surface of the first splined member is of a size and shape to receive and/or retain at least a portion of a first sealing member.

According to any of the previous aspects of the disclosure, the first sealing member of the quick connect assembly may be a grease cap.

According to any of the previous aspects of the disclosure, the first splined member of the quick connect assembly may further include a second receiving portion that is disposed directly adjacent to and axially outboard from the first receiving portion of the first splined member. A plurality of axially extending first splined member splines circumferentially extend along at least a portion of the inner surface of the second receiving portion of the first splined member.

According to any of the previous aspects of the disclosure, the first splined member of the quick connect assembly may further include a third receiving portion that is disposed axially outboard from and directly adjacent to an end of the second receiving portion opposite the first receiving portion of the first splined member. The third receiving portion circumferentially extends along at least a portion of the inner surface of the second end portion of the first splined member. Additionally, the first splined member retaining member groove is disposed within the inner surface of the third receiving portion of the first splined member.

According to any of the previous aspects of the disclosure, the first receiving portion of the first splined member has a diameter D3, the second receiving portion of the first splined member has a diameter D4, the third receiving portion of the first splined member has a diameter D5 where the diameter D4 of the second receiving portion is greater than the diameter D3 of the first receiving portion but is less than the diameter D5 of the third receiving portion of the first splined member.

According to any of the previous aspects of the disclosure, the first splined member of the quick connect assembly may be an end yoke.

According to any of the previous aspects of the disclosure, wherein the first splined member retaining member groove of the quick connect assembly has a first end portion and a second end portion. At least a portion of the second end portion of the first splined member retaining member groove may include a decreasing diameter portion having a first end and as second end. The decreasing diameter portion of the first splined member retaining member groove has a diameter that decreases from the first end to the second end of the decreasing diameter portion.

According to any of the previous aspects of the disclosure, the first splined member of the quick connect assembly may further include a lead-in chamfer having a first end portion and a second end portion circumferentially extending along at least a portion of the second end portion of the inner surface of said the splined member. The lead-in chamfer has a diameter that increases from the first end portion to the second end portion of the lead-in chamfer.

According to any of the previous aspects of the disclosure, the second splined member of the quick connect assembly may further include a first reduced diameter portion having a plurality of axially extending second splined member splines circumferentially extend along at least a portion of said outer surface of said first reduced diameter portion of the second splined member. The plurality of axially extending second splined member splines are complementary to and meshingly engaged with the plurality of axially extending first splined member splines.

According to any of the previous aspects of the disclosure, the second splined member of the quick connect assembly may further include a second reduced diameter portion where at least a portion of the second reduced diameter portion of the second splined member is received and/or retained within at least a portion of the third receiving portion of the first splined member.

According to any of the previous aspects of the disclosure, the second splined member retaining member groove of the quick connect assembly may be disposed within the outer surface of the second reduced diameter portion of the second splined member.

According to any of the previous aspects of the disclosure, the second splined member of the quick connect assembly may further include a second splined member sealing member groove circumferentially extending along at least a portion of the outer surface of the second reduced diameter portion of the second splined member. The second splined member sealing member groove is disposed directly adjacent to the second splined member retaining member groove in the outer surface of the second splined member. Additionally, the second splined member sealing member groove is of a size and shape to receive and/or retain at least a portion of a second sealing member.

According to any of the previous aspects of the disclosure, the second splined member of the quick connect assembly may further include a third reduced diameter portion that is disposed axially outboard from and directly adjacent to an end of the second reduced diameter portion of the second splined member, opposite the first reduced diameter portion of the second splined member.

According to any of the previous aspects of the disclosure, the quick connect assembly may further include a bearing assembly that is disposed radially outboard from at least a portion of the third reduced diameter portion of the second splined member.

According to any of the previous aspects of the disclosure, where the bearing assembly of the quick connect assembly may be a center bearing assembly, a roller bearing assembly, a needle bearing assembly, a tapered roller bearing assembly or an angular contact ball bearing assembly.

According to any of the previous aspects of the disclosure, the quick connect assembly may further include the use of a first shield that is connected to at least a portion of the third reduced diameter portion of the second splined member. At least a portion of the first shield member is interposed between the bearing assembly and the second end portion of the first splined member.

According to any of the previous aspects of the disclosure, the quick connect assembly may further include the use of a second shield member that is connected to at least a portion of the outer surface of the second splined member. At least a portion of the second shield member is disposed axially outboard from and adjacent to an end of the bearing assembly opposite the first shield member.

According to any of the previous aspects of the disclosure, the second splined member of the quick connect assembly may be a coupling shaft, a stub shaft or a midship tube shaft.

According to any one of the previous aspects of the disclosure, the retaining member of the quick connect assembly may have a plurality of interconnected radiused portions forming the body portion of the retaining member.

According to any of the previous aspects of the disclosure, the retaining member of the quick connect assembly may include a first radiused portion having a radius R1, a second radiused portion having a radius R2, a third radiused portion having a radius R3, a fourth radiused portion having a radius R4, a fifth radiused portion having a radius R5, a sixth radiused portion having a radius R6, a seventh radiused portion having a radius R7, an eighth radiused portion having a radius R8, a ninth radiused portion having a radius R9, a tenth radiused portion having a radius R10 and an eleventh radiused portion having a radius R11. The first, second third, fourth, fifth, sixth, seventh, eighth, ninth, tenth and eleventh radiused portions of the retaining member may be interconnected forming the body portion of the retaining member. As a non-limiting example, the radius R1 may be substantially equal to the radius R11, the radius R2 may be substantially equal to the radius R10, the radius R3 may be substantially equal to the radius R9, the radius R4 may be substantially equal to the radius R8 and the radius R5 may be substantially equal to the radius R7 of the retaining member.

According to any of the previous aspects of the disclosure, the innermost surface of the body portion of the retaining member may have a first arcuate portion, the outermost surface of the body portion of the retaining member may have a second arcuate portion, the first side of the body portion of the retaining member may have a first substantially flat portion and the second side of the body portion of the retaining member may have a second substantially flat portion. The first arcuate portion of the body portion of the retaining member of the quick connect assembly is connected to an end of the first and second substantially flat portions of the retaining member opposite the second arcuate portion of the body portion of the retaining member.

According to any of the previous aspects of the disclosure, the first and said second substantially flat portions of the retaining member of the quick connect assembly bilaterally truncate the body portion of the retaining member.

According to any of the previous aspects of the disclosure, the first substantially flat portion of the body portion of the retaining member may be substantially parallel to the second substantially flat portion of the body portion of the retaining member of the quick connect assembly.

According to any of the previous aspects of the disclosure, the first substantially flat portion of the first side of the body portion of the retaining member may not parallel to the second substantially flat portion of the second side of the body portion of the retaining member of the quick connect assembly.

According to any of the previous aspects of the disclosure, the first substantially flat portion of the first side of the body portion of the retaining member may extend at an angle relative to an axial center-line axis ACA1 of the body portion of the retaining member toward a radial center-line axis RCA1 of the body portion of the retaining member. The angle at which the first substantially flat portion of the retaining member extends provides a gap between a substantially vertical wall of the second splined member retaining member groove and an outer surface of said retaining member Additionally, the second substantially flat portion of the second side of the body portion of the retaining member may extend at an angle relative to the axial center-line axis ACA1 of the body portion of the retaining member toward the radial center-line axis RCA1 of the body portion of the retaining member of the quick connect assembly.

According to any of the previous aspects of the disclosure, the angle that the first substantially flat portion of the retaining member extends may be substantially equal to the angle that the second substantially flat portion of the retaining member extends According to any of the previous aspects of the disclosure, the first substantially flat portion of the retaining member of the quick connect assembly may have a length that is substantially equal to a length of the second substantially flat portion of the retaining member.

According to any of the previous aspects of the disclosure, the first arcuate portion of the retaining member of the quick connect assembly may have a length that is less than a length of the second arcuate portion of the retaining member.

According to any of the previous aspects of the disclosure, the length of the first arcuate portion of the retaining member of the quick connect assembly may be greater than the length of the second arcuate portion of the retaining member.

According to any of the previous aspects of the disclosure, the length of the first arcuate portion of the retaining member of the quick connect assembly may be substantially equal to the length of the second arcuate portion of the retaining member.

According to any of the previous aspects of the disclosure, the body portion of the retaining member of the quick connect assembly may have a substantially trapezoidal cross-sectional shape, a substantially circular cross-sectional shape or a substantially squircle cross-sectional shape.

A retaining member for use in a vehicle. The retaining member includes a body portion having a body portion with an innermost surface, an outermost surface, a first side and a second side. Additionally, the innermost surface of the body portion of the retaining member has a first arcuate portion, the outermost surface of the body portion of the retaining member has a second arcuate portion, the first side of said body portion of the retaining member has a first substantially flat portion and the second side of the body portion of the retaining member has a second substantially flat portion. A first end of the first arcuate portion of the body portion of the retaining member may be directly connected to a first end of the first substantially flat portion of the retaining member and a second end of the first arcuate portion may be directly connected to a first end of the second substantially flat portion of the retaining member. Furthermore, a first end of the second arcuate portion of the body portion of the retaining member may be directly connected to a second end of the first substantially flat portion of the retaining member and a second end of the arcuate portion may be directly connected to a second end of the second substantially flat portion of the retaining member.

According to any of the previous aspects of the disclosure, the first and second substantially flat portions of the body portion of the retaining member may bilaterally truncate the body portion of the retaining member.

According to any of the previous aspects of the disclosure, the first substantially flat portion of the body portion of the retaining member may be substantially parallel to the second substantially flat portion of the body portion of the retaining member.

According to any of the previous aspects of the disclosure, the first substantially flat portion of the first side of the body portion of the retaining member may be not parallel to the second substantially flat portion of the second side of the body portion of the retaining member.

According to any of the previous aspects of the disclosure, the first substantially flat portion of the first side of the body portion of the retaining member may extend at an angle relative to an axial center-line axis ACA1 of the body portion of the retaining member toward a radial center-line axis RCA1 of the body portion of the retaining member. Additionally, the second substantially flat portion of the second side of the body portion of the retaining member may extend at an angle relative to the axial center-line axis ACA1 of the body portion of the retaining member toward the radial center-line axis RCA1 of the body portion of the retaining member.

According to any of the previous aspects of the disclosure, the angle that the first substantially flat portion of the retaining member extends may be substantially equal to the angle that the second substantially flat portion of the retaining member extends According to any of the previous aspects of the disclosure, the first substantially flat portion of the retaining member may have a length that is substantially equal to a length of the second substantially flat portion of the retaining member.

According to any of the previous aspects of the disclosure, the first arcuate portion of the retaining member may have a length that is less than a length of the second arcuate portion of the retaining member.

According to any of the previous aspects of the disclosure, the length of the first arcuate portion of the retaining member may be greater than the length of the second arcuate portion of the retaining member.

According to any of the previous aspects of the disclosure, the length of the first arcuate portion of the retaining member may be substantially equal to the length of the second arcuate portion of the retaining member.

According to any of the previous aspects of the disclosure, the body portion of the retaining member may have a substantially trapezoidal cross-sectional shape or a substantially squircle cross-sectional shape.

According to any one of the previous aspects of the disclosure, the retaining member may have a plurality of interconnected radiused portions forming the body portion of the retaining member.

According to any of the previous aspects of the disclosure, the retaining member may include a first radiused portion having a radius R1, a second radiused portion having a radius R2, a third radiused portion having a radius R3, a fourth radiused portion having a radius R4, a fifth radiused portion having a radius R5, sixth radiused portion having a radius R6, a seventh radiused portion having a radius R7, an eighth radiused portion having a radius R8, a ninth radiused portion having a radius R9, a tenth radiused portion having a radius R10 and an eleventh radiused portion having a radius R11. The first, second third, fourth, fifth, sixth, seventh, eighth, ninth, tenth and eleventh radiused portions of the retaining member may be interconnected forming the body portion of the retaining member. As a non-limiting example, the radius R1 may be substantially equal to the radius R11, the radius R2 may be substantially equal to the radius R10, the radius R3 may be substantially equal to the radius R9, the radius R4 may be substantially equal to the radius R8 and the radius R5 may be substantially equal to the radius R7 of the retaining member.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 5 is a schematic top-plan view of a portion of a vehicle drive-line having a quick connect assembly according to an embodiment of the disclosure;

FIG. 5A is a cut-away schematic side-view of a portion of the quick connect assembly illustrated in FIG. 5 according to an embodiment of the disclosure;

FIG. 5B is a schematic detailed view of a portion of the quick connect assembly illustrated in FIGS. 5 and 5A of the disclosure;

FIG. 5C is a schematic side-view of a retaining member of the quick connect assembly illustrated in FIGS. 5-5B according to an embodiment of the disclosure;

FIG. 5D is a schematic cross-sectional view of a portion of a body portion of the retaining member illustrated in FIG. 5C according to an embodiment of the disclosure;

FIG. 7 is a schematic side-view of the retaining member illustrated in FIGS. 5-6A according to another embodiment of the disclosure; and FIG. 7A is a schematic cross-sectional view of a portion of a body portion of the retaining member illustrated in FIG. 7 according to an embodiment of the disclosure.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

It is within the scope of this disclosure, and as a non-limiting example, that the quick connect assemblies disclosed herein may be used in automotive, off-road vehicle, all-terrain vehicle, construction, structural, marine, aerospace, locomotive, military, machinery, robotic and/or consumer product applications. Additionally, as a non-limiting example, the quick connect assemblies disclosed herein may also be used in passenger vehicle, electric vehicle, hybrid vehicle, commercial vehicle, autonomous vehicles, semi-autonomous vehicles and/or heavy vehicle applications.

Figure 1:
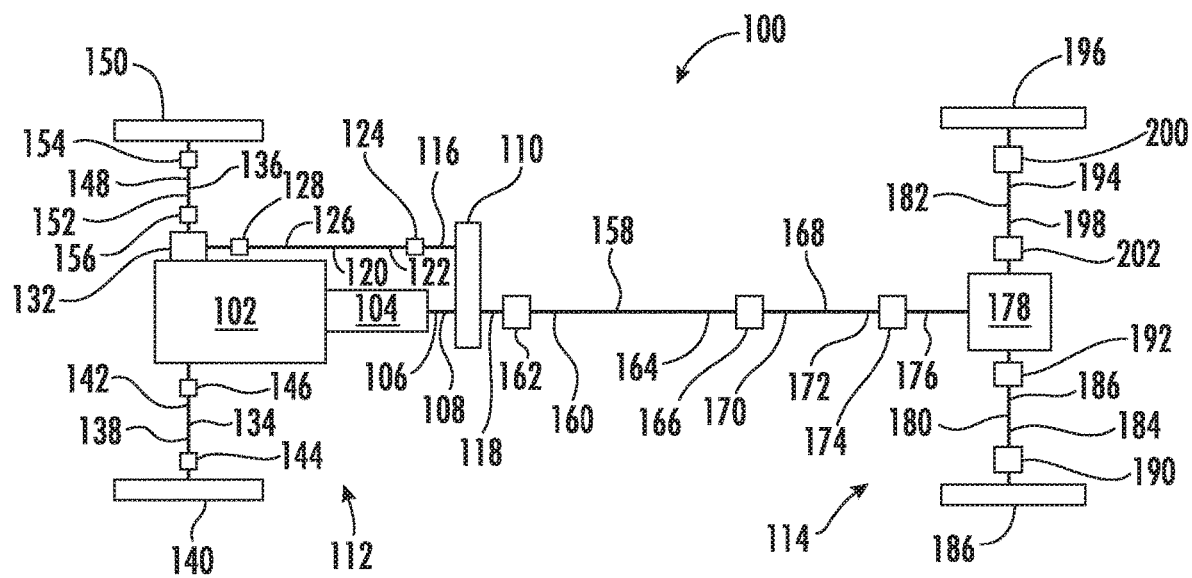
FIG. 1 is a schematic top-plan view of a vehicle having one or more quick connect assemblies according to an embodiment of the disclosure.

FIG. 1 is a schematic top-plan view of a vehicle 100 having one or more quick connect assemblies according to an embodiment of the disclosure. The vehicle 100 has an engine 102 which is drivingly connected to a transmission 104. A transmission output shaft 106 is then drivingly connected to an end of the transmission 104 opposite the engine 102. It is within the scope of this disclosure and as a non-limiting example that the engine 102 of the vehicle 100 may be an internal combustion engine, an electric motor, a steam turbine and/or a gas turbine. The transmission 104 is a power management system which provides controlled application of the rotational energy generated by the engine 102 by means of a gearbox.

The transmission output shaft 106 is drivingly connected to a transfer case input shaft 108 which in turn is drivingly connected to a transfer case 110. The transfer case 110 is used in four-wheel drive and/or all-wheel-drive (AWD) vehicles to transfer the rotational power from the transmission 104 to a front axle system 112 and a rear axle system 114 by utilizing a series of gears and drive shafts. Additionally, the transfer case 110 allows the vehicle 100 to selectively operate in either a two-wheel drive mode of a four-wheel/AWD drive mode. As illustrated in FIG. 1 of the disclosure and as a non-limiting example, the transfer case 110 includes a first transfer case output shaft 116 and a second transfer case output shaft 118.

A first shaft 120 extends from the first transfer case output shaft 116 toward the front axle system 112 of the vehicle 100. The first shaft 120 transmits the rotational power from the transfer case 110 to the front axle system 112 of the vehicle 100 thereby drivingly connecting the transfer case 110 to the front axle system 112. It is within the scope of this disclosure and as a non-limiting example that the first shaft 120 may be a drive shaft, a prop shaft or a Cardan shaft.

As illustrated in FIG. 1 of the disclosure and as a non-limiting example, at least a portion of a first end portion 122 of the first shaft 120 may be drivingly connected to an end of the first transfer case output shaft 116 opposite the transfer case 110 via a first joint assembly 124. Additionally, as illustrated in FIG. 1 of the disclosure and as a non-limiting example, at least a portion of a second end portion 126 of the first shaft 120 may be drivingly connected to an end of a second joint assembly 128. It is within the scope of this disclosure and as a non-limiting example that the first and/or second joint assembly 124 and/or 128 of the vehicle 100 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 128, opposite the first shaft 120, is a front axle input shaft 130. The front axle input shaft 130 of the vehicle 100 drivingly connects the first shaft 120 of the vehicle 100 to a front axle differential assembly 132 of the front axle system 112. In accordance with the embodiment to of the disclosure illustrated in FIG. 1 and as a non-limiting example, at least a portion of an end of the front axle system input shaft 130, opposite the first shaft 120, may be drivingly connected to at least a portion of the front axle differential assembly 132. It is within the scope of this disclosure and as a non-limiting example that the front axle input shaft 130 may be a front differential input shaft, a coupling shaft, stub shaft or a front differential pinion shaft. The front axle differential assembly 132 is a set of gears that allows the outer drive wheel(s) of the vehicle 100 to rotate at a faster rate that the inner drive wheel(s). The rotational power is transmitted through the front axle system 112 as described in more detail below.

The front axle system 112 further includes a first front axle half shaft 134 and a second front axle half shaft 136. As illustrated in FIG. 1 of the disclosure and as a non-limiting example, the first front axle half shaft 134 extends substantially perpendicular to the front axle input shaft 130 of the vehicle 100. At least a portion of a first end portion 138 of the first front axle half shaft 134 may be drivingly connected to a first front axle wheel assembly 140 and at least a portion of a second end portion 142 of the first front axle half shaft 134 may be drivingly connected to an end of the front axle differential assembly 132. It is within the scope of this disclosure and as a non-limiting example that the second end portion 142 of the first front axle half shaft 134 may be drivingly connected to a front differential side gear, a separate stub shaft, a separate coupling shaft, a first front axle differential output shaft, a first front axle half shaft connect and disconnect assembly and/or a shaft that is formed as part of a front differential side gear.

According to an embodiment of the disclosure and as a non-limiting example, at least a portion of the first end portion 138 of the first front axle half shaft 134 may be drivingly connected to an end of a third joint assembly 144. In accordance with this embodiment of the disclosure and as a non-limiting example, at least a portion of an end of the third joint assembly 144, opposite the first front axle half shaft 134, may be drivingly connected to at least a portion of the first front axle wheel assembly 140 of the vehicle 100. It is within the scope of this disclosure and as a non-limiting example that the third joint assembly 144 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with an embodiment of the disclosure and as a non-limiting example, at least a portion of the second end portion 142 of the first front axle half shaft 134 may be drivingly connected to an end of a fourth joint assembly 146. As a non-limiting example, at least a portion of an end of the fourth joint assembly 146, opposite the first front axle half shaft 134 may be drivingly connected to at least a portion of the end of the front axle differential assembly 132 of the vehicle 100. It is within the scope of this disclosure and as a non-limiting example that the fourth joint assembly 146 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that at least a portion of the end of the fourth joint assembly 146, opposite the first front axle half shaft 134, may be drivingly connected to a differential side gear, a separate stub shaft, a separate coupling shaft, a first front axle differential output shaft, a first front axle half shaft connect and disconnect assembly and/or a shaft that is formed as part of a differential side gear.

The second front axle half shaft 136 extends substantially perpendicular to the front axle system input shaft 130 of the vehicle 100. At least a portion of a first end portion 148 of the second front axle half shaft 136 may be drivingly connected to a second front axle wheel assembly 150. As illustrated in FIG. 1 of the disclosure and as a non-limiting example, at least a portion of a second end portion 152 of the second front axle half shaft 136 may be drivingly connected to an end of the front axle differential assembly 132 opposite the first front axle half shaft 134. It is within the scope of this disclosure and as a non-limiting example that the second end portion 152 of the second front axle half shaft 136 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

According to an embodiment of the disclosure and as a non-limiting example, at least a portion of the first end portion 148 of the second front axle half shaft 136 may be drivingly connected to an end of a fifth joint assembly 154. In accordance with this embodiment of the disclosure and as a non-limiting example, at least a portion of an end of the fifth joint assembly 154, opposite the second front axle half shaft 136, may be drivingly connected to at least a portion of the second front axle wheel assembly 150 of the vehicle 100. It is within the scope of this disclosure and as a non-limiting example that the fifth joint assembly 154 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with an embodiment of the disclosure and as a non-limiting example, at least a portion of the second end portion 152 of the second front axle half shaft 136 may be drivingly connected to an end of a sixth joint assembly 156. As a non-limiting example, at least a portion of an end of the sixth joint assembly 156, opposite the second front axle half shaft 136, may be drivingly connected to the end of the front axle differential assembly 132 of the vehicle 100 opposite the first front axle half shaft 134. It is within the scope of this disclosure and as a non-limiting example that the sixth joint assembly 156 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that the end of the six joint assembly 156, opposite the second front axle half shaft 136, may be drivingly connected to a differential side gear, a separate stub shaft, a separate coupling shaft, a second front axle differential output shaft, a second front axle half shaft connect and disconnect assembly and/or a shaft that is formed as part of a differential side gear.

An end of the second transfer case output shaft 118 is drivingly connected to an end of the transfer case 110 opposite the transfer case input shaft 108 of the vehicle 100. A second shaft 158 extends from the second transfer case output shaft 118 toward the rear axle system 114 thereby drivingly connecting the transfer case 110 to the rear axle system 114 of the vehicle 100. As a non-limiting example, the second shaft 158 may be a drive shaft, a propeller shaft or a Cardan shaft. At least a portion of a first end portion 160 of the second shaft 158 may be drivingly connected to an end of the second transfer case output shaft 118 opposite the transfer case 110 via a seventh joint assembly 162. It is within the scope of this disclosure and as a non-limiting example that the second shaft 158 may be a drive shaft, a propeller shaft or a Cardan shaft. Additionally, it is within the scope of this disclosure and as a non-limiting example that the seventh joint assembly 162 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

As illustrated in FIG. 1 of the disclosure and as a non-limiting example, at least a portion of a second end portion 164 of the second shaft 158 may be drivingly connected to an end of an eighth joint assembly 166. It is within the scope of this disclosure and as a non-limiting example that the eighth joint assembly 166 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the eighth joint assembly 166, opposite the second shaft 158, is a third shaft 168 having a first end portion 170 and a second end portion 172. At least a portion of the first end portion 170 of the third shaft 168 may be drivingly connected to an end of the eighth joint assembly 166 opposite the second shaft 158 of the vehicle 100. As best seen in FIG. 1 of the disclosure and as a non-limiting example, at least a portion of the second end portion 172 of the third shaft 168 may be drivingly connected to at least a portion of an end of a ninth joint assembly 174. It is within the scope of this disclosure and as a non-limiting example that the third shaft 168 may be a drive shaft, a propeller shaft or a Cardan shaft. Additionally, it is within the scope of this disclosure and as a non-limiting example that the ninth joint assembly 174 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

In accordance with the embodiment illustrated in FIG. 1 and as a non-limiting example, at least a portion of a rear axle system input shaft 176 may be drivingly connected to at least a portion of an end of the ninth joint assembly 174 opposite the third shaft 168. The rear axle system input shaft 176 drivingly connects the transfer case 110 the rear axle system 114 of the vehicle 100. As a non-limiting example, the rear axle system input shaft 176 may be a rear axle differential input shaft, a coupling shaft, stub shaft or a rear axle differential pinion shaft. Drivingly connected to an end of the rear axle system input shaft 176, opposite the third shaft 168, is a rear axle differential assembly 178. The rear axle differential assembly 178 is a set of gears that allows the outer drive wheel(s) of the vehicle 100 to rotate at a faster rate that the inner drive wheel(s). The rotational power is transmitted through the rear axle system 114 as described in more detail below.

As illustrated in FIG. 1 and as a non-limiting example, the rear axle system 114 further includes a first rear axle half shaft 180 and a second rear axle half shaft 182. The first rear axle half shaft 180 extends substantially perpendicular to the rear axle input shaft 176 of the vehicle 100. At least a portion of a first end portion 184 of the first rear axle half shaft 180 may be drivingly connected to a first rear axle wheel assembly 186 and at least a portion of a second end portion 188 of the first rear axle half shaft 180 may be drivingly connected to an end of the rear axle differential assembly 178. It is within the scope of this disclosure and as a non-limiting example that the second end portion 188 of the first rear axle half shaft 180 may be drivingly connected to a rear differential side gear, a separate stub shaft, a separate coupling shaft, a first rear axle differential output shaft a first rear axle half shaft connect and disconnect assembly and/or a shaft that is formed as part of a rear differential side gear.

According to an embodiment of the disclosure and as a non-limiting example, at least a portion of the first end portion 184 of the first rear axle half shaft 180 may be drivingly connected to an end of a tenth joint assembly 190. In accordance with this embodiment of the disclosure and as a non-limiting example, at least a portion of an end of the tenth joint assembly 190, opposite the first rear axle half shaft 180, may be drivingly connected to at least a portion of the first rear axle wheel assembly 186 of the vehicle 100. It is within the scope of this disclosure and as a non-limiting example that the tenth joint assembly 190 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with this embodiment of the disclosure and as a non-limiting example, at least a portion of the second end portion 188 of the first rear axle half shaft 180 may be drivingly connected to an end of an eleventh joint assembly 192. As a non-limiting example, at least a portion of an end of the eleventh joint assembly 192, opposite the first rear axle half shaft 180, may be drivingly connected to the end of the rear axle differential assembly 178 of the vehicle 100. It is within the scope of this disclosure and as a non-limiting example that the eleventh joint assembly 192 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that the end of the eleventh joint assembly 192, opposite the first rear axle half shaft 180, may be drivingly connected to a differential side gear, a separate stub shaft, a separate coupling shaft, a first rear axle differential output shaft, a first rear axle half shaft connect and disconnect assembly and/or a shaft that is formed as part of a differential side gear.

The second rear axle half shaft 182 of the vehicle 100 extends substantially perpendicular to the rear axle system input shaft 176. At least a portion of a first end portion 194 of the second rear axle half shaft 182 may be drivingly connected to a second rear axle wheel assembly 196 of the vehicle 100. As illustrated in FIG. 1 and as a non-limiting example, at least a portion of a second end portion 198 of the second rear axle half shaft 182 may be drivingly connected to an end of the rear axle differential assembly 178 opposite the first rear axle half shaft 180. It is within the scope of this disclosure and as a non-limiting example that the second end portion 198 of the second rear axle half shaft 182 may be drivingly connected to a rear differential side gear, a separate stub shaft, a separate coupling shaft, a second rear axle differential output shaft, a second rear axle half shaft connect and disconnect assembly and/or a shaft that is formed as part of a rear differential side gear.

According to an embodiment of the disclosure and as a non-limiting example, at least a portion of the first end portion 194 of the second rear axle half shaft 182 may be drivingly connected to an end of a twelfth joint assembly 200. In accordance with this embodiment of the disclosure and as a non-limiting example, at least a portion of an end of the twelfth joint assembly 200, opposite the second rear axle half shaft 182, may be drivingly connected to at least a portion of the second rear axle wheel assembly 196 of the vehicle 100. It is within the scope of this disclosure and as a non-limiting example that the twelfth joint assembly 200 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with this embodiment of the disclosure and as a non-limiting example, at least a portion of the second end portion 198 of the second rear axle half shaft 182 may be drivingly connected to an end of a thirteenth joint assembly 202 of the vehicle 100. As a non-limiting example, at least a portion of an end of the thirteenth joint assembly 202, opposite the second rear axle half shaft 182, may be drivingly connected to the end of the rear axle differential assembly 178 opposite the first rear axle half shaft 180. It is within the scope of this disclosure and as a non-limiting example that the thirteenth joint assembly 202 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that the end of the thirteenth joint assembly 202, opposite the second rear axle half shaft 182, may be drivingly connected to a differential side gear, a separate stub shaft, a separate coupling shaft, a second rear axle differential output shaft, a second rear axle half shaft connect and disconnect assembly and/or a shaft that is formed as part of a differential side gear.

It is within the scope of this disclosure and as a non-limiting example that one or more of the joint assemblies 124, 128, 144, 146, 154, 156, 162, 166, 174, 190, 192, 200 and/or 202 may include the use of a quick connect assembly according to an embodiment of the disclosure.

Figure 2:
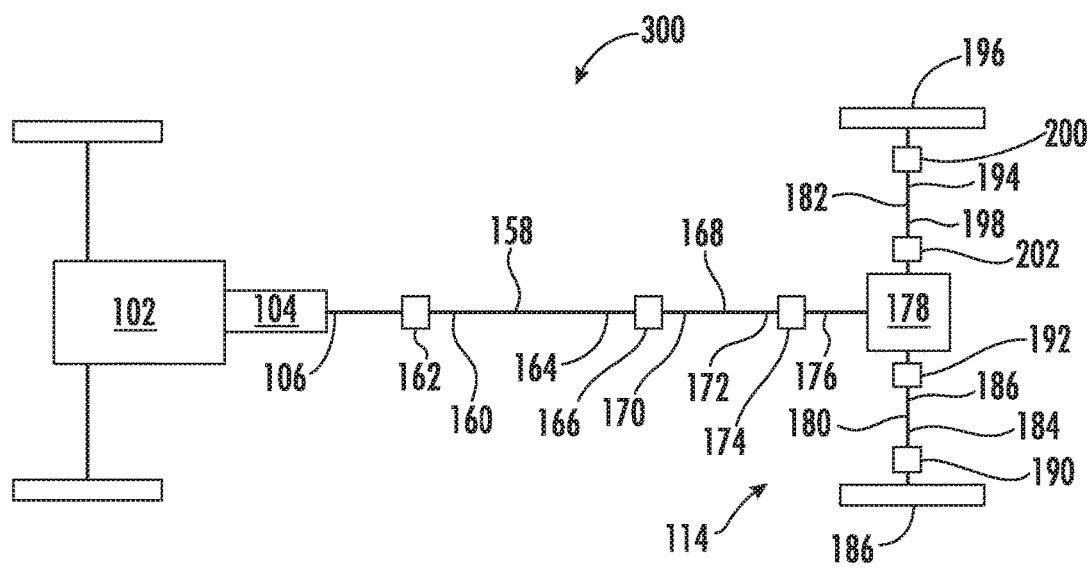
FIG. 2 is a schematic top-plan view of another vehicle having one or more quick connect assemblies according to an embodiment of the disclosure.

FIG. 2 is a schematic top-plan view of another vehicle 300 having one or more quick connect assemblies according to an embodiment of the disclosure. The vehicle 300 illustrated in FIG. 2 is the same as the vehicle 100 illustrated in FIG. 1, except where specifically noted below. As illustrated in FIG. 2 of the disclosure and as a non-limiting example, the vehicle 300 does not include the use of the transfer case 110 that drivingly connects the transmission 104 to the front axle differential assembly 132 of the front axle system 112.

In accordance with the embodiment of the disclosure illustrated in FIG. 2 and as a non-limiting example, at least a portion of the end of the transmission output shaft 106, opposite the transmission 104, is drivingly connected to at least a portion of the end of the seventh joint assembly 162 opposite the second shaft 158 of the vehicle 300. As a result, in accordance with the embodiment of the disclosure illustrated in FIG. 2 and as a non-limiting example, the second shaft 158 of the vehicle 300 extends from the transmission output shaft 106 toward the rear axle system 114 of the vehicle 300.

It is within the scope of this disclosure and as a non-limiting example that one or more of the joint assemblies 162, 166, 174, 190, 192, 200 and/or 202 may include the use of a quick connect assembly according to an embodiment of the disclosure.

Figure 3:
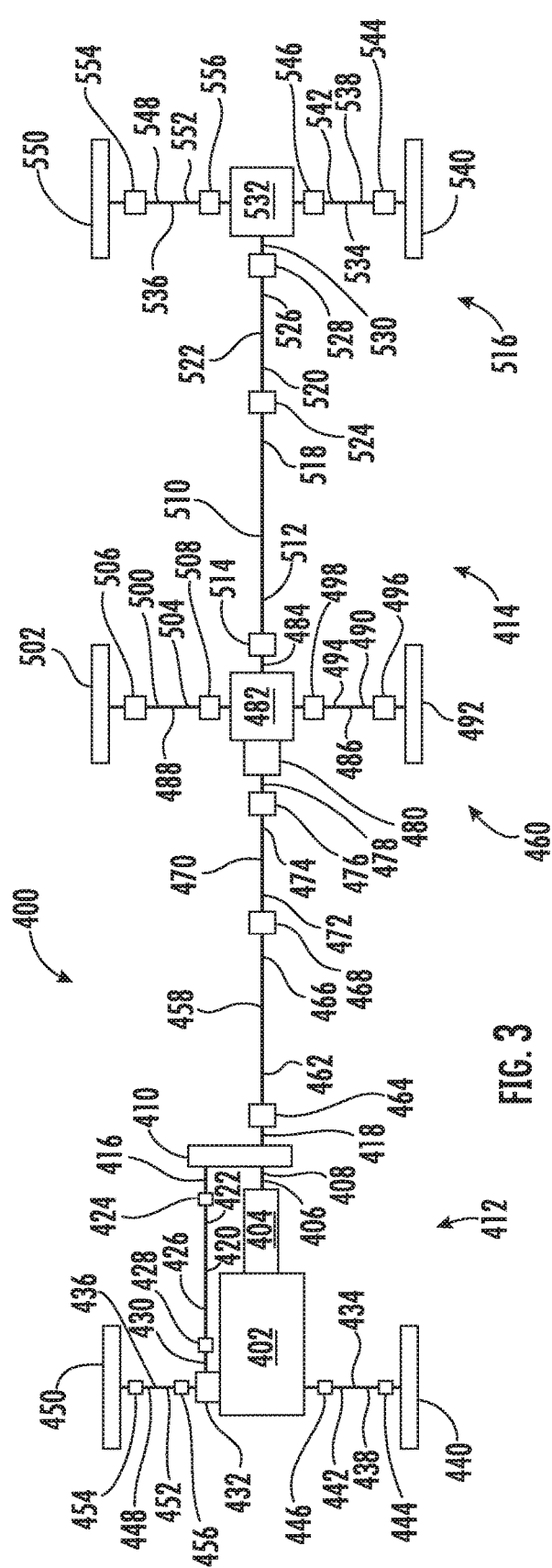
FIG. 3 is a schematic top-plan view of yet another vehicle having one or more quick connect assemblies according to an embodiment of the disclosure.

FIG. 3 is a schematic top-plan view yet another vehicle 400 having one or more quick connect assemblies according to an embodiment of the disclosure. The vehicle 400 has an engine 402 which is drivingly connected to a transmission 404. As non-limiting example, the engine 402 of the vehicle 400 may be an internal combustion engine, an electric motor, a steam turbine and/or a gas turbine. A transmission output shaft 406 is then drivingly connected to an end of the transmission 404 opposite the engine 402 of the vehicle 400. As previously discussed in relation to FIG. 1, the transmission 404 is a power management system which provides controlled application of the rotational energy generated by the engine 402 by means of a gearbox.

Drivingly connected to an end of the transmission output shaft 406, opposite the transmission 404 is a transfer case input shaft 408. As illustrated in FIG. 3 of the disclosure and as a non-limiting example, drivingly connected to an end of the transfer case input shaft 408, opposite the transmission output shaft 406, is a transfer case 410 of the vehicle 400. The transfer case 410 of the vehicle 400 allows for the selective transfer the rotational power from the transmission 404 to a front axle system 412 and a tandem axle system 414 of the vehicle 400 by utilizing a series of gears and drive shafts. As illustrated in FIG. 3 of the disclosure and as a non-limiting example, the transfer case 410 includes a first transfer case output shaft 416 and a second transfer case output shaft 418.

A first shaft 420 extends from the first transfer case output shaft 416 toward the front axle system 412 of the vehicle 400. The first shaft 420 transmits the rotational power from the transfer case 410 to the front axle system 412 of the vehicle 400 thereby drivingly connecting the transfer case 410 to the front axle system 412. It is within the scope of this disclosure and as a non-limiting example that the first shaft 420 may be a drive shaft, a prop shaft, a Cardan shaft, an axle half shaft or a differential pinion shaft.

As illustrated in FIG. 3 of the disclosure and as a non-limiting example, at least a portion of a first end portion 422 of the first shaft 420 may be drivingly connected to an end of the first transfer case output shaft 416 opposite the transfer case 410 via a first joint assembly 424. Additionally, as illustrated in FIG. 3 of the disclosure and as a non-limiting example, at least a portion of a second end portion 426 of the first shaft 420 may be drivingly connected to an end of a second joint assembly 428. It is within the scope of this disclosure and as a non-limiting example that the first and/or second joint assembly 424 and/or 428 of the vehicle 400 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the second joint assembly 428, opposite the first shaft 420, is a front axle input shaft 430. The front axle input shaft 430 of the vehicle 400 drivingly connects the first shaft 420 of the vehicle 400 to a front axle differential assembly 432 of the front axle system 412. In accordance with the embodiment illustrated in FIG. 3 and as a non-limiting example, at least a portion of an end of the front axle system input shaft 430, opposite the first shaft 420, is drivingly connected to at least a portion of the front axle differential assembly 432. It is within the scope of this disclosure and as a non-limiting example that the front axle input shaft 430 may be a front differential input shaft, a coupling shaft, stub shaft or a front differential pinion shaft. The front axle differential assembly 432 is a set of gears that allows the outer drive wheel(s) of the vehicle 400 to rotate at a faster rate that the inner drive wheel(s). The rotational power is transmitted through the front axle system 412 as described in more detail below.

The front axle system 412 further includes a first front axle half shaft 434 and a second front axle half shaft 436. As illustrated in FIG. 3 and as a non-limiting example, the first front axle half shaft 434 extends substantially perpendicular to the front axle input shaft 430 of the vehicle 400. At least a portion of a first end portion 438 of the first front axle half shaft 434 may be drivingly connected to a first front axle wheel assembly 440 and at least a portion of a second end portion 442 of the first front axle half shaft 434 may be drivingly connected to an end of the front axle differential assembly 432. It is within the scope of this disclosure and as a non-limiting example that the second end portion 442 of the first front axle half shaft 434 may be drivingly connected to a front differential side gear, a separate stub shaft, a separate coupling shaft, a first front axle differential output shaft, a first front axle half shaft connect and disconnect assembly and/or a shaft that is formed as part of a front differential side gear.

According to an embodiment of the disclosure and as a non-limiting example, at least a portion of the first end portion 438 of the first front axle half shaft 434 may be drivingly connected to at least a portion of an end of a third joint assembly 444. In accordance with this embodiment of the disclosure and as a non-limiting example, at least a portion of an end of the third joint assembly 444, opposite the first front axle half shaft 434, may be drivingly connected to at least a portion of the first front axle wheel assembly 440 of the vehicle 400. It is within the scope of this disclosure and as a non-limiting example that the third joint assembly 444 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with this embodiment of the disclosure and as a non-limiting example, at least a portion of the second end portion 442 of the first front axle half shaft 434 may be drivingly connected to an end of a fourth joint assembly 446. As a non-limiting example, at least a portion of an end of the fourth joint assembly 446, opposite the first front axle half shaft 434 may be drivingly connected to the end of the front axle differential assembly 432 of the vehicle 400. It is within the scope of this disclosure and as a non-limiting example that the fourth joint assembly 446 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that the end of the fourth joint assembly 446, opposite the first front axle half shaft 434, may be drivingly connected to a differential side gear, a separate stub shaft, a separate coupling shaft, a first front axle differential output shaft, a first front axle half shaft connect and disconnect assembly and/or a shaft that is formed as part of a differential side gear.

The second front axle half shaft 436 extends substantially perpendicular to the front axle system input shaft 430 of the vehicle 400. At least a portion of a first end portion 448 of the second front axle half shaft 436 may be drivingly connected to a second front axle wheel assembly 450. As illustrated in FIG. 3 of the disclosure and as a non-limiting example, at least a portion of a second end portion 452 of the second front axle half shaft 436 may be drivingly connected to an end of the front axle differential assembly 432 opposite the first front axle half shaft 434. It is within the scope of this disclosure and as a non-limiting example that the second end portion 452 of the second front axle half shaft 436 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

According to an embodiment of the disclosure and as a non-limiting example, at least a portion of the first end portion 448 of the second front axle half shaft 436 may be drivingly connected to an end of a fifth joint assembly 454. In accordance with this embodiment of the disclosure and as a non-limiting example, at least a portion of an end of the fifth joint assembly 454, opposite the second front axle half shaft 436, may be drivingly connected to at least a portion of the second front axle wheel assembly 450 of the vehicle 400. It is within the scope of this disclosure and as a non-limiting example that the fifth joint assembly 454 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with this embodiment of the disclosure and as a non-limiting example, at least a portion of the second end portion 452 of the second front axle half shaft 436 may be drivingly connected to an end of a sixth joint assembly 456. As a non-limiting example, at least a portion of an end of the sixth joint assembly 456, opposite the second front axle half shaft 436, may be drivingly connected to the end of the front axle differential assembly 432 of the vehicle 400 opposite the first front axle half shaft 434. It is within the scope of this disclosure and as a non-limiting example that the sixth joint assembly 456 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that the end of the six joint assembly 456, opposite the second front axle half shaft 436, may be drivingly connected to a differential side gear, a separate stub shaft, a separate coupling shaft, a second front axle differential output shaft, a second front axle half shaft connect and disconnect assembly and/or a shaft that is formed as part of a differential side gear.

An end of the second transfer case output shaft 418 may be drivingly connected to an end of the transfer case 410 opposite the transfer case input shaft 408 of the vehicle 400. A second shaft 458 extends from the second transfer case output shaft 418 toward a forward tandem axle system 460 of the tandem axle system 414 of the vehicle 400. As a non-limiting example, the second shaft 558 may be a drive shaft, a propeller shaft or a Cardan shaft.

At least a portion of a first end portion 462 of the second shaft 458 may be drivingly connected to an end of the second transfer case output shaft 418 opposite the transfer case 410 via a seventh joint assembly 464. It is within the scope of this disclosure and as a non-limiting example that the seventh joint assembly 464 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

As illustrated in FIG. 3 of the disclosure and as a non-limiting example, at least a portion of a second end portion 466 of the second shaft 458 may be drivingly connected to an end of an eighth joint assembly 468. It is within the scope of this disclosure and as a non-limiting example that the eighth joint assembly 468 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the eighth joint assembly 468, opposite the second shaft 458, is a third shaft 470 having a first end portion 472 and a second end portion 474. At least a portion of the first end portion 472 of the third shaft 470 may be drivingly connected to an end of the eighth joint assembly 468 opposite the second shaft 458 of the vehicle 400. As illustrated in FIG. 3 of the disclosure and as a non-limiting example, at least a portion of the second end portion 474 of the third shaft 470 may be drivingly connected to at least a portion of an end of a ninth joint assembly 476. It is within the scope of this disclosure and as a non-limiting example that the third shaft 470 may be a drive shaft, a propeller shaft or a Cardan shaft. Additionally, it is within the scope of this disclosure and as a non-limiting example that the ninth joint assembly 476 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

In accordance with the embodiment of the disclosure illustrated in FIG. 3 and as a non-limiting example, an end of the ninth joint assembly 476, opposite the third shaft 470, may be drivingly connected at least a portion of an end a forward tandem axle input shaft 478. As a non-limiting example, the forward tandem axle input shaft 478 may be a forward tandem axle differential input shaft, a coupling shaft, stub shaft, a forward tandem axle differential pinion shaft, an inter-axle differential input shaft or an inter-axle differential pinion shaft. Drivingly connected to an end of the forward tandem axle input shaft 478, opposite the third shaft 470, is an inter-axle differential assembly 480 of the forward tandem axle system 460 of the vehicle 400. The inter-axle differential assembly 480 is a device that divides the rotational power generated by the engine 402 between the axles in the vehicle 400. The rotational power is transmitted through the forward tandem axle system 460 as described in more detail below.

As illustrated in FIG. 3 of the disclosure and as a non-limiting example, the inter-axle differential assembly 480 of the vehicle 400 is drivingly connected to a forward tandem axle differential assembly 482 and a forward tandem axle system output shaft 484. The forward tandem axle differential assembly 482 is a set of gears that allows the outer drive wheel(s) of the vehicle 400 to rotate at a faster rate than the inner drive wheel(s).

The forward tandem axle system 460 of the vehicle 400 further includes a first forward tandem axle half shaft 486 and a second forward tandem axle half shaft 488. As illustrated in FIG. 3 and as a non-limiting example, the first forward tandem axle half shaft 486 extends substantially perpendicular to the forward tandem axle input shaft 478 of the vehicle 400. At least a portion of a first end portion 490 of the first forward tandem axle half shaft 486 may be drivingly connected to at least a portion of a first forward tandem axle wheel assembly 492 and at least a portion of a second end portion 494 of the first forward tandem axle half shaft 486 may be drivingly connected to an end of the forward tandem axle differential assembly 482. It is within the scope of this disclosure and as a non-limiting example that the second end portion 494 of the first forward tandem axle half shaft 486 may be drivingly connected to a forward tandem axle differential side gear, a separate stub shaft, a separate coupling shaft, a first forward tandem axle differential output shaft, a first forward tandem axle half shaft connect and disconnect assembly and/or a shaft that is formed as part of a forward tandem axle differential side gear.

According to an embodiment of the disclosure and as a non-limiting example, at least a portion of the first end portion 490 of the first forward tandem axle half shaft 486 may be drivingly connected to at least a portion of an end of a tenth joint assembly 496. In accordance with this embodiment of the disclosure and as a non-limiting example, at least a portion of an end of the tenth joint assembly 496, opposite the first forward tandem axle half shaft 486, may be drivingly connected to at least a portion of the first forward tandem axle wheel assembly 492 of the vehicle 400. It is within the scope of this disclosure and as a non-limiting example that the tenth joint assembly 496 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with an embodiment of the disclosure and as a non-limiting example, at least a portion of the second end portion 494 of the first forward tandem axle half shaft 486 may be drivingly connected to at least a portion of an end of an eleventh joint assembly 498. As a non-limiting example, at least a portion of an end of the eleventh joint assembly 498, opposite the first forward tandem axle half shaft 486, may be drivingly connected to the end of the forward tandem axle differential assembly 482 of the vehicle 400. It is within the scope of this disclosure and as a non-limiting example that the eleventh joint assembly 498 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that at least a portion of the end of the eleventh joint assembly 498, opposite the first forward tandem axle half shaft 486, may be drivingly connected to a forward tandem axle differential side gear, a separate stub shaft, a separate coupling shaft, a first forward tandem axle differential output shaft, a first forward tandem axle half shaft connect and disconnect assembly and/or a shaft that is formed as part of a forward tandem axle differential side gear.

The second forward tandem axle half shaft 488 extends substantially perpendicular to the forward tandem axle input shaft 478 of the vehicle 400. At least a portion of a first end portion 500 of the second forward tandem axle half shaft 488 may be drivingly connected to at least a portion of a second forward tandem axle wheel assembly 502 of the vehicle 400. As illustrated in FIG. 3 of the disclosure and as a non-limiting example, at least a portion of a second end portion 504 of the second forward tandem axle half shaft 488 may be drivingly connected to an end of the forward tandem axle differential assembly 482 opposite the first forward tandem axle half shaft 486. It is within the scope of this disclosure and as a non-limiting example that the second end portion 504 of the second forward tandem axle half shaft 488 may be drivingly connected to a forward tandem axle differential side gear, a separate stub shaft, a separate coupling shaft, a second forward tandem axle differential output shaft, a second forward tandem axle half shaft connect and disconnect assembly and/or a shaft that is formed as part of a forward tandem axle differential side gear.

According to an embodiment of the disclosure and as a non-limiting example, at least a portion of the first end portion 500 of the second forward tandem axle half shaft 488 may be drivingly connected to at least a portion of an end of a twelfth joint assembly 506. In accordance with this embodiment of the disclosure and as a non-limiting example, at least a portion of an end of the twelfth joint assembly 506, opposite the second forward tandem axle half shaft 488, may be drivingly connected to at least a portion of the second forward tandem axle wheel assembly 502 of the vehicle 400. It is within the scope of this disclosure and as a non-limiting example that the twelfth joint assembly 506 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with an embodiment of the disclosure and as a non-limiting example, at least a portion of the second end portion 504 of the second forward tandem axle half shaft 488 may be drivingly connected to at least a portion of an end of a thirteenth joint assembly 508. As a non-limiting example, at least a portion of an end of the thirteenth joint assembly 508, opposite the second forward tandem axle half shaft 488, may be drivingly connected to the end of the forward tandem axle differential assembly 482 opposite the first forward tandem axle half shaft 486 of the vehicle 400. It is within the scope of this disclosure and as a non-limiting example that the thirteenth joint assembly 508 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that at least a portion of the end of the thirteenth joint assembly 508, opposite the second forward tandem axle half shaft 488, may be drivingly connected to a forward tandem axle differential side gear, a separate stub shaft, a separate coupling shaft, a second forward tandem axle differential output shaft, a second forward tandem axle half shaft connect and disconnect assembly and/or a shaft that is formed as part of a forward tandem axle differential side gear.

One end of the forward tandem axle system output shaft 484 may be drivingly connected to a side of the inter-axle differential assembly 480 opposite the forward tandem axle input shaft 478. An end of the forward tandem axle system output shaft 484, opposite the inter-axle differential assembly 480, may be drivingly connected to a first end portion 510 of a fourth shaft 512 via a fourteenth joint assembly 514. The fourth shaft 510 extends from the forward tandem axle system output shaft 484 toward a rear tandem axle system 516 of the tandem axle system 414 of the vehicle 400. It is within the scope of this disclosure and as a non-limiting example, that the fourth shaft 510 may be a drive shaft, a propeller shaft or a Cardan shaft. Additionally, it is within the scope of this disclosure and as a non-limiting example that the fourteenth joint assembly 514 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

At least a portion of a second end portion 518 of the fourth shaft 510 may be drivingly connected to at least a portion of a first end portion 520 of a fifth shaft 522 via a fifteenth joint assembly 524. The fifth shaft 522 extends from an end of the fifteenth joint assembly 524, opposite the fourth shaft 510, toward the rear axle system 516 of the vehicle 400. Drivingly connected to at least a portion of a second end portion 526 of the fifth shaft 522 is a sixteenth joint assembly 528. It is within the scope of this disclosure and as a non-limiting example that the fifth shaft 522 may be a drive shaft, a propeller shaft or a Cardan shaft. Additionally, it is within the scope of this disclosure and as a non-limiting example that the fifteenth and/or the sixteenth joint assembly 524 and/or 528 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Drivingly connected to an end of the sixteenth joint assembly 528, opposite the fifth shaft 522, is an end of rear tandem axle system input shaft 530. The rear tandem axle system input shaft 530 drivingly connects the inter-axle differential assembly 480 to a rear tandem axle differential assembly 532 of the rear tandem axle system 516 of the vehicle 400. As a non-limiting example, the rear tandem axle system input shaft 530 may be a rear tandem axle differential input shaft, a coupling shaft, stub shaft or a rear tandem axle differential pinion shaft. At least a portion of an end of the rear tandem axle system input shaft 530, opposite the fifth shaft 522, may be drivingly connected to at least a portion of the rear tandem axle differential assembly 532. The rear tandem axle differential assembly 532 is a set of gears that allows the outer drive wheel(s) of the vehicle 400 to rotate at a faster rate that the inner drive wheel(s). The rotational power is transmitted through the rear tandem axle system 516 as described in more detail below.

The rear tandem axle system 516 of the vehicle 400 further includes a first rear tandem axle half shaft 534 and a second rear tandem axle half shaft 536. As illustrated in FIG. 3 of the disclosure and as a non-limiting example, the first rear tandem axle half shaft 534 extends substantially perpendicular to the rear tandem axle input shaft 530 of the vehicle 400. At least a portion of a first end portion 538 of the first rear tandem axle half shaft 534 may be drivingly connected to at least a portion of a first rear tandem axle wheel assembly 540 and at least a portion of a second end portion 542 of the first rear tandem axle half shaft 534 may be drivingly connected to an end of the rear tandem axle differential assembly 532. It is within the scope of this disclosure and as a non-limiting example that the second end portion 542 of the first rear tandem axle half shaft 534 may be drivingly connected to a rear tandem axle differential side gear, a separate stub shaft, a separate coupling shaft, a first rear tandem axle differential output shaft, a first rear tandem axle half shaft connect and disconnect assembly and/or a shaft that is formed as part of a rear tandem axle differential side gear.

According to an embodiment of the disclosure and as a non-limiting example, at least a portion of the first end portion 538 of the first rear tandem axle half shaft 534 may be drivingly connected to at least a portion of an end of a seventeenth joint assembly 544. In accordance with this embodiment of the disclosure and as a non-limiting example, at least a portion of an end of the seventeenth joint assembly 544, opposite the first rear tandem axle half shaft 534, may be drivingly connected to at least a portion of the first rear tandem axle wheel assembly 540 of the vehicle 400. It is within the scope of this disclosure and as a non-limiting example that the seventeenth joint assembly 544 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with an embodiment of the disclosure and as a non-limiting example, at least a portion of the second end portion 542 of the first rear tandem axle half shaft 534 may be drivingly connected to at least a portion of an end of an eighteenth joint assembly 546. As a non-limiting example, at least a portion of an end of the eighteenth joint assembly 546, opposite the first rear tandem axle half shaft 534, may be drivingly connected to the end of the rear tandem axle differential assembly 532. It is within the scope of this disclosure and as a non-limiting example that the eighteenth joint assembly 546 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that at least a portion of the end of the eighteenth joint assembly 546, opposite the first rear tandem axle half shaft 534, may be drivingly connected to a rear tandem axle differential side gear, a separate stub shaft, a separate coupling shaft, a first rear tandem axle differential output shaft, a first rear tandem axle half shaft connect and disconnect assembly and/or a shaft that is formed as part of a rear tandem axle differential side gear.

The second rear tandem axle half shaft 536 extends substantially perpendicular to the rear tandem axle input shaft 530 of the vehicle 400. At least a portion of a first end portion 548 of the second rear tandem axle half shaft 536 may be drivingly connected to at least a portion of a second rear tandem axle wheel assembly 550. As illustrated in FIG. 3 of the disclosure and as a non-limiting example, at least a portion of a second end portion 552 of the second rear tandem axle half shaft 536 may be drivingly connected to an end of the rear tandem axle differential assembly 532 opposite the first rear tandem axle half shaft 534. It is within the scope of this disclosure and as a non-limiting example that the second end portion 552 of the second rear tandem axle half shaft 534 may be drivingly connected to a rear tandem axle differential side gear, a separate stub shaft, a separate coupling shaft, a second rear tandem axle differential output shaft, a second rear tandem axle half shaft connect and disconnect assembly and/or a shaft that is formed as part of a rear tandem axle differential side gear.

According to an embodiment of the disclosure and as a non-limiting example, at least a portion of the first end portion 548 of the second rear tandem axle half shaft 536 may be drivingly connected to at least a portion of an end of a nineteenth joint assembly 554. In accordance with this embodiment of the disclosure and as a non-limiting example, at least a portion of an end of the nineteenth joint assembly 554, opposite the second rear tandem axle half shaft 536, may be drivingly connected to at least a portion of the second rear tandem axle wheel assembly 550 of the vehicle 400. It is within the scope of this disclosure and as a non-limiting example that the nineteenth joint assembly 554 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

Additionally, in accordance with an embodiment of the disclosure and as a non-limiting example, at least a portion of the second end portion 552 of the second rear tandem axle half shaft 536 may be drivingly connected to at least a portion of an end of a twentieth joint assembly 556. As a non-limiting example, at least a portion of an end of the twentieth joint assembly 556, opposite the second rear tandem axle half shaft 536, may be drivingly connected to the end of the rear tandem axle differential assembly 532 opposite the first rear tandem axle half shaft 534. It is within the scope of this disclosure and as a non-limiting example that the twentieth joint assembly 556 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly. Additionally, it is within the scope of this disclosure and as a non-limiting example that at least a portion of the end of the twentieth joint assembly 556, opposite the second rear tandem axle half shaft 536, may be drivingly connected to a rear tandem axle differential side gear, a separate stub shaft, a separate coupling shaft, a second rear tandem axle differential output shaft, a second rear tandem axle half shaft connect and disconnect assembly and/or a shaft that is formed as part of a rear tandem axle differential side gear.

It is within the scope of this disclosure and as a non-limiting example that one or more of the joint assemblies 424, 428, 444, 446, 454, 456, 464, 468, 476, 496, 498, 506, 508, 514, 524, 528, 544, 546, 554 and/or 556 may include the use of a quick connect assembly according to an embodiment of the disclosure.

Figure 4:
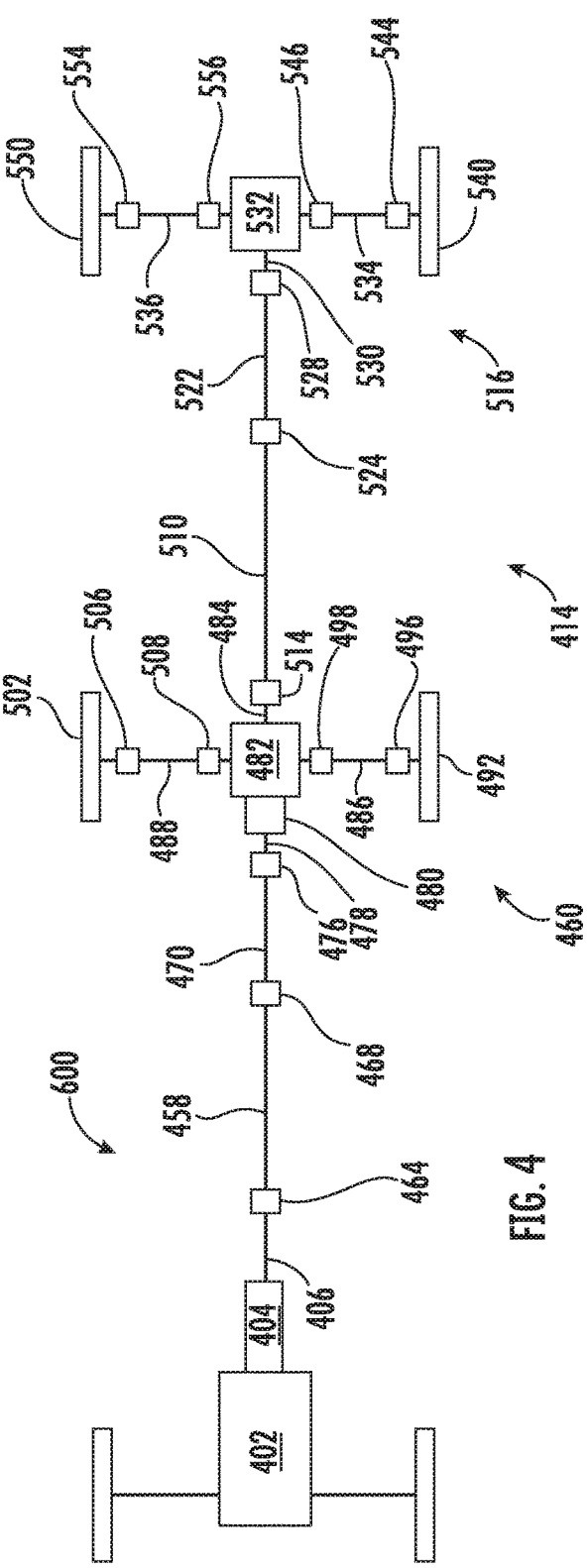
FIG. 4 is a schematic top-plan view of still yet another vehicle having one or more quick connect assemblies according to an embodiment of the disclosure.

FIG. 4 is a schematic top-plan view of still yet another vehicle 600 having one or more quick connect assemblies according to an embodiment of the disclosure. The vehicle 600 illustrated in FIG. 4 is the same as the vehicle 400 illustrated in FIG. 3, except where specifically noted below. As illustrated in FIG. 4 of the disclosure and as a non-limiting example, the vehicle 600 does not include the use of the transfer case 410 that drivingly connects the transmission 404 to the front axle differential assembly 432 of the front axle system 412.

In accordance with the embodiment of the disclosure illustrated in FIG. 4 and as a non-limiting example, at least a portion of the end of the transmission output shaft 406, opposite the transmission 404, is drivingly connected to at least a portion of an end of the seventh joint assembly 464 opposite the second shaft 458 of the vehicle 600. As a result, in accordance with the embodiment of the disclosure illustrated in FIG. 4 and as a non-limiting example, the second shaft 458 extends from the transmission output shaft 406 toward the forward tandem axle system 460 of a tandem axle system 414 of the vehicle 600.

It is within the scope of this disclosure and as a non-limiting example that one or more of the joint assemblies 464, 468, 476, 496, 498, 506, 508, 514, 524, 528, 544, 546, 554 and/or 556 may include the use of a quick connect assembly according to an embodiment of the disclosure.

Figure 5E:
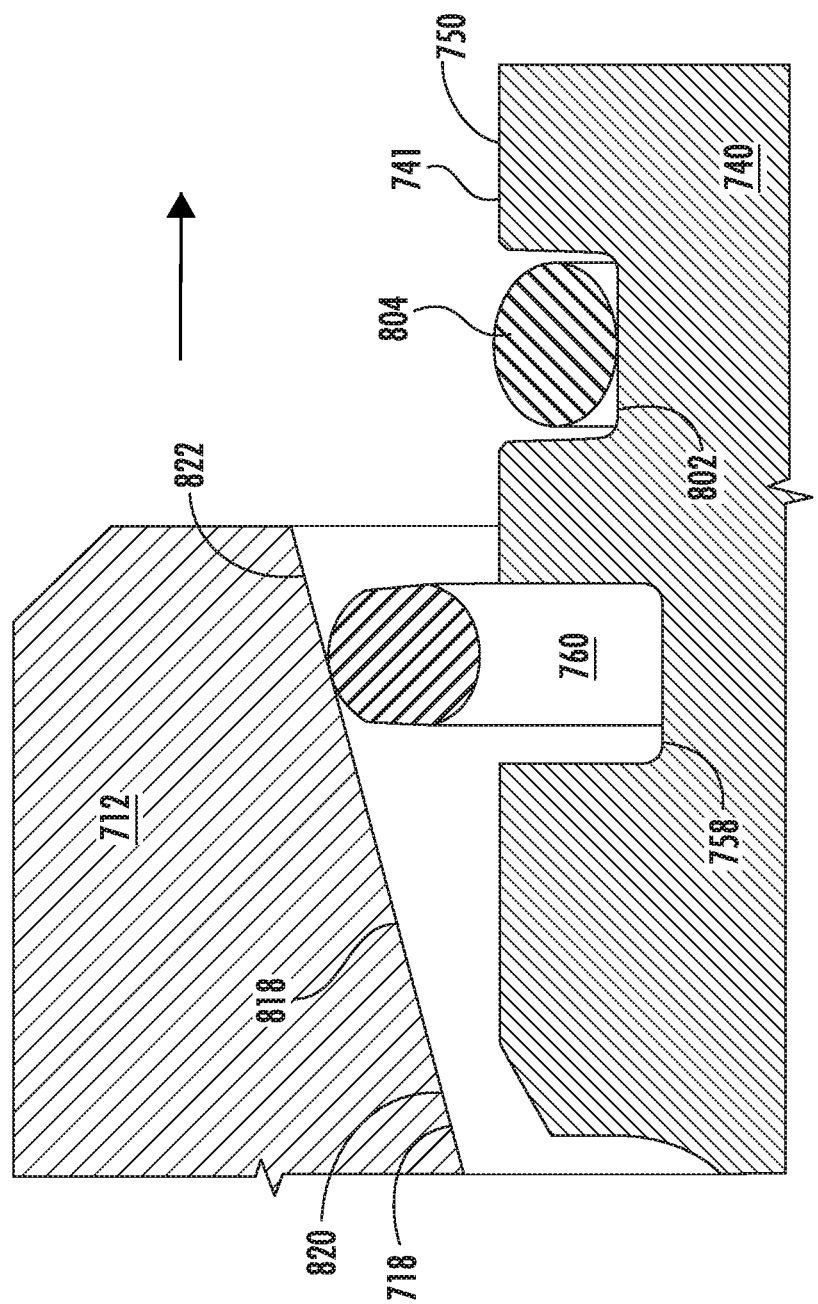
FIG. 5E is a schematic side-view of a portion of the quick connect assembly illustrated in FIGS. 5-5D when the quick connect assembly is being assembled.

FIGS. 5-5E provide a schematic a portion of a vehicle drive-line 700 having a quick connect assembly 702 according to an embodiment of the disclosure. As illustrated in FIG. 5 of the disclosure and as a non-limiting example, the vehicle drive-line 700 includes a first shaft 704 having a first end portion (not shown), second end portion 706 and an outer surface 708. It is within the scope of this disclosure and as a non-limiting example that the first shaft may be a drive shaft, a prop shaft, a Cardan shaft, an axle half shaft, a stub shaft, a coupling shaft, a shaft formed as part of a differential side gear or a differential pinion shaft.

Drivingly connected to at least a portion of the second end portion 706 of the first shaft 704 is a joint assembly 710 having a first splined member 712. According to the embodiment of the disclosure illustrated in FIG. 5 and as a non-limiting example, the joint assembly 710 may be a universal joint assembly, a U-joint assembly, a cardan joint assembly, a double cardan joint assembly, a Hooke's joint assembly, a Spicer joint assembly or a Hardy Spicer joint assembly. In accordance with an alternative embodiment of the disclosure (not shown), the joint assembly 710 may be a homokinetic joint assembly, a constant velocity joint assembly having a first splined member.

As best seen in FIG. 5A of the disclosure and as a non-limiting example, the first splined member 712 has an inner surface 718, an outer surface 720, a first end portion 714, a second end portion 716 and an intermediate portion 715 interposed between the first and second end portions 714 and 716 of the first splined member 712. The inner surface 718 and the outer surface 720 defines a hollow portion 722 therein. According to the embodiment of the disclosure illustrated in FIG. 5A and as a non-limiting example, the first splined member 712 may be an end yoke. While the embodiment of the disclosure illustrated in FIG. 5A illustrates the first splined member 712 as being an end yoke, it is within the scope of this disclosure and as a non-limiting example that the first splined member 712 may be a coupling shaft, a stub shaft, an inner race, an outer race or a shaft formed as part of a differential side gear.

Circumferentially extending from at least a portion of the outer surface 720 of the first end portion 714 of the first splined member 712 is a first increased diameter portion 724. Disposed axially inboard from and directly adjacent to the first increased diameter portion 724 of the first splined member 712, is a second increased diameter portion 726. As best seen in FIG. 5A of the disclosure and as a non-limiting example, the second increased diameter portion 726 circumferentially extends from at least a portion of the outer surface 720 of the first splined member 712. In accordance with the embodiment of the disclosure illustrated in FIG. 5A and as a non-limiting example, the first increased diameter portion has a diameter D1 that is larger than a diameter D2 of the second increased diameter portion 726 of the first splined member 712.

The inner surface of the first splined member 712 includes, in axial order from the first end portion 714 to the second end portion 716 of the first splined member 712, is a first receiving portion 728, a second receiving portion 730 and a third receiving portion 732. As best seen in FIG. 5A of the disclosure and as a non-limiting example, the first receiving portion 728 has a diameter D3, the second receiving portion 730 has a diameter D4 and the third receiving portion 732 has a diameter D5. It is within the scope of this disclosure and as a non-limiting example that the diameter D5 of the third receiving portion 732 is less than the diameter D3 of the first receiving portion 728 but is greater than the diameter D4 of the second receiving portion 730 of the first splined member 712 of the quick connect assembly 702.

In accordance with the embodiment of the disclosure illustrated in FIG. 5A and as a non-limiting example, the first receiving portion 728 circumferentially extends along at least a portion of the inner surface 718 of the intermediate portion 715 of the first splined member 712. The first receiving portion 728 of the first splined member 712 has a size and shape to receive and/or retain at least a portion of a first sealing member 734. The first sealing member 734 of the quick connect assembly 702 aids in preventing the migration of dirt, debris and/or moisture into the quick connect assembly 702 thereby improving the overall life and durability of the assembly 702. Additionally, it is within the scope of this disclosure and as a non-limiting example that the first sealing member 734 may also aid in preventing the migration of an amount of lubrication fluid (not shown) out of the quick connect assembly 702 thereby improving the overall life and durability of the assembly 702. As a non-limiting example, the first sealing member 734 may be a grease cap.

According to an embodiment of the disclosure (not shown) and as a non-limiting example, the first sealing member 734 of the quick connect assembly 702 may be replaced with a wall portion (not shown). In accordance with this embodiment of the disclosure and as a non-limiting example, the wall portion (not shown) aids in preventing the migration of dirt, debris and/or moisture into the quick connect assembly 702. Additionally, the wall portion (not shown) may also aid in preventing the migration of an amount of lubrication fluid (not shown) out of the quick connect assembly 702.

The second receiving portion 730 of the first splined member circumferentially extends along at least a portion of the inner surface 718 of the first splined member 712 of the quick connect assembly 702. As best seen in FIG. 5A of the disclosure and as a non-limiting example, the second receiving portion 730 of the first splined member 712 is disposed directly adjacent to and axially outboard from the first receiving portion 728. Additionally, as illustrated in FIG. 5A of the disclosure and as a non-limiting example, the second receiving portion 730 is interposed between the first receiving portion 728 and the third receiving portion 732 of the first splined member 712. Circumferentially extending along at least a portion of the inner surface 718 of the second receiving portion 730 of the first splined member 712 is a plurality of axially extending first splined member splines 736.

Disposed directly adjacent to an end of the second receiving portion 730, opposite the first receiving portion 728, is the third receiving portion 732 of the first splined member 712 of the quick connect assembly 702. As best seen in FIG. 5A of the disclosure and as a non-limiting example, the third receiving portion 732 circumferentially extends along at least a portion of the second end portion 716 of the inner surface 718 of the first splined member 712. Additionally, as best seen in FIG. 5A of the disclosure and as a non-limiting example, a first splined member retaining member groove 738 having a first end portion 739 and a second end portion 741 circumferentially extends along at least a portion of the inner surface 718 of the third receiving portion 732 of the first splined member 712. The first splined member retaining member groove 738 of the first splined member 712 is of a size and shape to receive and/or retain at least a portion of a retaining member 760.

As best seen in FIG. 5B of the disclosure and as a non-limiting example, at least a portion of the second end portion 741 of the first splined member retaining member groove 738 may include the use of a decreasing diameter portion 743 having a first end 745 and a second end 747. In accordance with the embodiment of the disclosure illustrated in FIGS. 5A and 5B and as a non-limiting example, the decreasing diameter portion 741 of the first splined member retaining member groove 738 has a diameter that decreases from the first end 745 to the second end 747 of the groove 738. It is to be understood that the decreasing diameter portion 743 of the first splined member retaining member groove 738 aids in facilitating the dis-assembly of the quick connect assembly 702.

Drivingly connected to at least a portion of the first splined member 712 is a second splined member 740. As best seen in FIG. 5A of the disclosure and as a non-limiting example, the second splined member 740 has an outer surface 741, a first end portion 742, a second end portion 744 and an intermediate portion 746 interposed between the first and second end portions 742 and 744 of the second splined member 740 of the quick connect assembly 702. It is within the scope of this disclosure and as a non-limiting example that the second splined member 740 may be a midship tube shaft, a coupling shaft, a stub shaft, a drive shaft, a prop shaft, a Cardan shaft, a differential pinion shaft, a shaft formed as part of a differential side gear or an axle half shaft.

In accordance with the embodiment of the disclosure illustrated in FIG. 5A and as a non-limiting example, the second splined member 740 includes, in axial order from the first end portion 742 to the second end portion 746 of the second splined member 740, is a first reduced diameter portion 748, a second reduced diameter portion 750 and a third reduced diameter portion 752. The first reduced diameter portion 748 has a diameter D6, the second reduced diameter portion 750 has a diameter D7 and the third reduced diameter portion 752 has a diameter D8. It is within the scope of this disclosure and as a non-limiting example that the diameter D7 of the second reduced diameter portion 750 is greater than the diameter D6 of the first reduced diameter portion 748 but is less than the diameter D8 of the third reduced diameter portion 752 of the second splined member 740 of the quick connect assembly 702.

When the quick connect assembly 702 is assembled, at least a portion of the first and second reduced diameter portion 748 and 750 of the second splined member 740 is received and/or retained within at least a portion of the first splined member 712 of the quick connect assembly 702.

Circumferentially extending along at least a portion of the outer surface 741 of the first reduced diameter portion 748 of the first end portion 742 of the second splined member 740 is a plurality of axially extending second splined member splines 756. The plurality of axially extending second splined member splines 756 of the second splined member 740 are complementary to and meshingly engaged with the plurality of axially extending first splined member splines 736 of the first splined member 712.

A second splined member retaining member groove 758 circumferentially extends along at least a portion of the outer surface 741 of the second reduced diameter portion 750 of the intermediate portion 746 of the second splined member 740 of the quick connect assembly 702. The second splined member retaining member groove 758 of the second splined member 740 is complementary to and aligned with the first splined member retaining member groove 738 in the first splined member 712 of the quick connect assembly 702. As best seen in FIGS. 5A and 5B of the disclosure and as a non-limiting example the second splined member retaining member groove 758 is of a size and shape to receive and/or retain at least a portion of the retaining member 760. It is within the scope of this disclosure and as a non-limiting example that the retaining member 760 may be a snap-ring, a circlip, a seeger ring, a C-clip or a Jesus clip.

As previously discussed and as best seen in FIG. 5B of the disclosure, the decreasing diameter portion 743 of the first splined member retaining member groove 738 aids in facilitating the dis-assembly of the quick connect assembly 702. During dis-assembly of the quick connect assembly 702, at least a portion of the decreasing diameter portion 743 of the first spline member retaining member groove 738 comes into direct contact with at least a portion of the retaining member 760. Once the decreasing diameter portion 743 is in direct contact with the retaining member 760, the decreasing diameter portion 743 applies an amount of downward force onto the retaining member 760, causing the retaining member 760 to retract within the second splined member retaining member groove 758. Once the retaining member 760 is retracted within the second splined member retaining member groove 758, it provides the clearance needed to allow the first splined member 712 to be separated from second splined member 740 of the quick connect assembly 702. It is therefore to be understood that the decreasing diameter portion 743 of the first splined member retaining member groove 738 aids in making the dis-assembly of the first splined member 712 from the second splined member 740 quicker and easier for service personnel.

As best seen in FIGS. 5C and 5D of the disclosure and as a non-limiting example, the retaining member 760 of the quick connect assembly 702 has a body portion 761 with an innermost surface 762, an outermost surface 764, a first side 766 and a second side 768. In accordance with the embodiment of the disclosure illustrated in FIG. 5C and as a non-limiting example, the retaining member 760 may have a substantially ellipsoidal or a substantially circular shape.

The innermost surface 762 of the body portion 761 of the retaining member 760 may have a plurality of interconnected radiused portions interposed between a first end 780 and a second end 782 of the body portion 761 of the retaining member 760. In accordance with the embodiment of the disclosure illustrated in FIG. 5C and as a non-limiting example, the innermost surface 762 of the body portion 761 of the retaining member 760 may include, in axial order from the first end 780 to the second end 782 of the body portion 761, a first radiused portion 783 having a radius R1, a second radiused portion 785 having a radius R2, a third radiused portion 787 having a radius R3, a fourth radiused portion 789 having a radius R4, fifth radiused portion 791 having a radius R5, a sixth radiused portion 793 having a radius R6, a seventh radiused portion 795 having a radius R7, an eighth radiused portion 797 having a radius R8, ninth radiused portion 799 having a radius R9, a tenth radiused portion 801 having a radius R10 and an eleventh radiused portion 803 having a radius R11. As best seen in FIG. 5C of the disclosure and as a non-limiting example the radiused portions 783, 785, 787, 789, 791, 793, 795, 797, 799, 801 and 803 may be interconnected in order to form the body portion 761 of the retaining member 760. It is within the scope of this disclosure and as a non-limiting example that the radii R1 and R11 may be substantially equal to each other, the radii R2 and R10 may be substantially equal to each other, the radii R3 and R9 may be substantially equal to each other, the radii R4 and R8 may be substantially equal to each other and the radii R5 and R7 may be substantially equal to each other. Additionally, it is within the scope of this disclosure and as a non-limiting example that the radius R6 of the body portion 761 of the retaining member 760 may be substantially equal to or greater than the radii R1, R2, R3, R4, R5, R7, R8, R9, R10 and/or R11 of the body portion 761 of the retaining member 760.

FIG. 5D of the disclosure provides a schematic cross-sectional view of a portion of the body portion 761 of the retaining member 760 along the line D-D illustrated in FIG. 5C. In accordance with the embodiment of the disclosure illustrated in FIG. 5D and as a non-limiting example, the innermost surface 762 of the body portion 761 of the retaining member 760 may include a first arcuate portion 786 and the outermost surface 764 may include a second arcuate portion 788. Additionally, the first side 766 of the body portion 761 of the retaining member 760 may include a first substantially flat portion 790 and the second side 768 may include a second substantially flat portion 792. As best seen in FIG. 5D of the disclosure and as a non-limiting example, the first arcuate portion 786 of the retaining member 760 may have a first end 824 directly connected to a first end 826 of the first substantially flat portion 790 and a second end 828 directly connected to a first end 830 of the second substantially flat portion 792 of the retaining member 760. Additionally, as best seen in FIG. 5D of the disclosure and as a non-limiting example, a first end 832 of the second arcuate portion 788 may be directly connected to a second end 834 of the first substantially flat portion 790 of the retaining member 760 and a second end 836 of the second arcuate portion 788 may be directly connected to a second end 838 of the second substantially flat portion 792 of the retaining member 760. As a result, it is therefore to be understood that the ends of the first arcuate portion 786 of the body portion 761 of the retaining member 760 may be directly connected to the ends of the first and second substantially flat portions 790 and 792 opposite the second arcuate portion 788 of the retaining member 760. The first and second substantially flat portions 790 and 792 of the body portion 761 of the retaining member 760 therefore bilaterally truncate the body portion 761 of the retaining member 760 of the quick connect assembly 702.

In accordance with the embodiment of the disclosure illustrated in FIG. 5D and as a non-limiting example, the first substantially flat portion 790 of the retaining member 760 may extend at an angle θ1 relative to an axial center-line axis ACA1 of the body portion 761 of the retaining member 760. Additionally, according to the embodiment illustrated in FIG. 5D of the disclosure and as a non-limiting example, the second substantially flat portion 792 of the retaining member 760 may extend at an angle θ2 relative to the axial center-line ACA1 of the body portion 761 of the retaining member 760. It is within the scope of this disclosure and as a non-limiting example that the first and second substantially flat portions 790 and 792 of the retaining member 760 may extend at angles θ1 and θ2 toward a radial center-line axis RCA1 of the body portion 761 of the retaining member 760. As a result, it is to be understood that the first and second substantially flat portions 790 and 792 of the body portion 761 of the retaining member 760 are non-parallel to each other and provide a retaining member 760 with a body portion 761 having a substantially trapezoidal cross-sectional shape.

The first substantially flat portion 790 of the body portion 761 of the retaining member 760 has a length L1, the second substantially flat portion 792 has a length L2, the first arcuate portion 786 has a circumferential length L3 and the second arcuate portion 788 has a circumferential length L4. It is within the scope of this disclosure and as a non-limiting example that the lengths L1 and L2 of the first and second substantially flat portions 790 and 792 of the retaining member 760 may be substantially equal to each other. Additionally, it is within the scope of this disclosure and as a non-limiting example that the circumferential length L3 of the first arcuate portion 786 may be greater than the circumferential length L4 of the second arcuate portion 788 of the body portion 761 of the retaining member 760 of the quick connect assembly 702.

As best seen in FIG. 5B of the disclosure and as a non-limiting example, when the quick connect assembly 702 is assembled, at least a portion of the retaining member 760 is received and/or retained within at least a portion of the first splined member retaining member groove 738 and the second splined member retaining member groove 758 of the first and second splined member 712 and 760. By providing the body portion 761 of the retaining member 760 with the second substantially flat portion 792 disposed at the angle θ2, it provides the retaining member 760 with the additional clearance needed to allow the retaining member 760 to fully expand into the first splined member retaining member groove 738 in the first splined member 712. This aids in ensuring that there is robust connection between the first and second splined members 712 and 740 thereby ensuring that the first and second splined member 712 and 740 are sufficiently axially restrained relative to one another. As a result, the quick connect assembly 702 described and illustrated herein is less susceptible to unexpected and unwanted separations of the first splined member 712 from the second splined member 760. It is therefore to be understood that the shape of the retaining member 760 aids in providing the robust connection between the first and second splined members 712 and 740 described herein.

Additionally, as best seen in FIG. 5B of the disclosure and as a non-limiting example, by disposing the first substantially flat portion 790 of the retaining member 760 at an angle θ1, it provides a gap 794 between a substantially vertical wall 796 of the second splined member retaining member groove 758 and an outer surface 798 of the retaining member 760. In accordance with the embodiment of the disclosure illustrated in FIG. 5B and as a non-limiting example, the gap 794 between the substantially vertical wall 796 and the outer surface 798 of the retaining member 760 has a length L5. The length L5 of the gap 794 is sufficient to allow the retaining member 760 to easily retract into the second splined member retaining member groove 758, during dis-assembly, without the outer surface 798 of the retaining member 760 "binding-up". As a result, the length L5 of the gap 794 is sufficient to allow the retaining member 760 to retract within the second splined member retaining member groove 758 without contacting a corner 800 of the groove 758 of the second splined member 740. It is therefore to be understood that the shape of the retaining member 760 aids in preventing the "binding-up" of the retaining member 760 with the second splined member retaining member groove 758. Additionally, it is therefore to be understood that the shape of the retaining member 760 aids in providing a quick connect assembly 702 where the first splined member 712 may be easily disassembled from the second splined member 740.

The retaining member 760 described and illustrated herein, is also less susceptible and therefore less sensitive to natural manufacturing variations inherent in the manufacturing of the various components of the quick connect assembly 702. It is within the scope of this disclosure and as a non-limiting example that the retaining member 760 may be heat treated by using one or more heat treating processes, hardened by using one or more hardening processes, and/or austempered. Additionally, it is to be understood that the geometry of the retaining member 760 aids in reducing the overall amount of force needed to assemble and dis-assemble the first splined member 712 from the second splined member 740 of the quick connect assembly 702. As a result, it is within the scope of this disclosure and as a non-limiting example that the retaining member 760 may be made from a metallic material, a spring metal, a plastic material composition, a thermoplastic material composition, a Nylon material composition, a plastic acrylic material composition, an acrylonitrile butadiene styrene material composition, a polymeric material composition, a polycarbonate material composition, a polystyrene material composition or a polyoxymethylene material composition.

Disposed directly adjacent to and axially outboard from the second splined member retaining member groove 758 of the second splined member 740 is a second splined member sealing member groove 802. As best seen in FIGS. 5A and 5B of the disclosure and as a non-limiting example, the second splined member sealing member groove 802 circumferentially extends along at least a portion of the outer surface 741 of the second reduced diameter portion 750 of the second splined member 740.

The second splined member sealing member groove 802 is of a size and shape to receive and/or retain at least a portion a second sealing member 804. When assembled, at least a portion of the second sealing member 804 is sealingly engaged with at least a portion of the inner surface 718 of the third receiving portion 732 of the first splined member 712 and at least a portion of the outer surface 741 of the second reduced diameter portion 750 of the second splined member 740. The second sealing member 804 aids in preventing the migration of dirt, debris and/or moisture into the quick connect assembly 702 thereby improving the overall life and durability of the assembly 702. Additionally, the second sealing member 804 aids in ensuring that the lubrication fluid (not shown) disposed within the quick connect assembly 702 is retained therein. This aids in preventing the occurrence of amount of corrosion within the quick connect assembly 702 that may negatively impact the dis-assembly and serviceability of the assembly 702. It is within the scope of the is disclosure and as a non-limiting example that the second sealing member 804 of the quick connect assembly 702 may be an O-ring or any other member that is capable of sealingly engaging at least a portion of the inner surface 718 of the first splined member 712 and at least a portion of the outer surface 741 of the second splined member 740.

As best seen in FIG. 5A of the disclosure and as a non-limiting example, the quick connect assembly 702 may further include the use of a bearing assembly 806. At least a portion of the bearing assembly 806 is disposed radially outboard from at least a portion of the third reduced diameter portion 752 of the second splined member 740. The bearing assembly provides rotational support for the second splined member 740 when the quick connect assembly 702 is in operation. It is within the scope of this disclosure and as a non-limiting example that the bearing assembly 806 may be a center bearing assembly, a roller bearing assembly, a needle bearing assembly, a tapered roller bearing assembly or an angular contact ball bearing assembly.

In accordance with the embodiment of the disclosure where the quick connect assembly 702 includes the use of the bearing assembly 806, the assembly 702 may further include the use of a first shield member 808 and/or a second shield member 810 that are connected to at least a portion of the outer surface 741 of the second splined member 740. As best seen in FIG. 5A of the disclosure and as a non-limiting example, at least a portion of the first shield member 808 is connected to at least a portion of the third reduced diameter portion 752 of the second splined member 740. Additionally, at least a portion of the first shield member 808 is interposed between in the bearing assembly 806 and the second end portion 716 of the first splined member 712. As best seen in FIG. 5A of the disclosure and as a non-limiting example, at least a portion of the second shield member 810 is disposed axially outboard from an end of the bearing assembly 806 opposite the first splined member 712 of the quick connect assembly 702. The first and/or the second shield members 808 and/or 810 aid in preventing debris from contacting the bearing assembly 806 when in operation. It is within the scope of this disclosure and as a non-limiting example that the first and/or second shield members 808 and/or 810 may be a first and second slinger respectively.

The second end portion 746 of the second splined member 740 may include a hollow interior portion 812. The hollow interior portion 812 of the second end portion 746 of the second splined member 740 is of a size and shape to receive and/or retain at least a portion of a first end portion 814 of a second shaft 816. As a result, at least a portion of the first end portion 814 of the second shaft 816 is drivingly connected to at least a portion of the second end portion 746 of the second splined member 740. It is within the scope of this disclosure and as a non-limiting example that the second shaft 816 may be a drive shaft, a prop shaft, a cardan shaft, a coupling shaft, a stub shaft, a differential pinion shaft, a shaft formed as part of a differential side gear or an axle half shaft.

As best seen in FIGS. 5A and 5E of the disclosure and as a non-limiting example, the first splined member 712 may further include the use of a lead-in chamfer 818 circumferentially extending along at least a portion of the inner surface 718 of the second end portion 716 of the first splined member 712. The lead-in chamfer 818 of the first splined member 712 has a first end portion 820 and a second end portion 822. Additionally, the lead-in chamfer 818 of the first splined member 712 has a diameter that increases from the first end portion 820 to the second end portion 822 of the lead-in chamfer 818. The lead-in chamfer 818 of the first splined member 712 aids in facilitating the assembly of the first splined member 712 to the second splined member 740 of the quick connect assembly 702. When the quick connect assembly 702 is assembled, at least a portion of the lead-in chamfer 818 of the first splined member 712 contacts at least a portion of the retaining member 760 applying an amount of downward force thereon. As the retaining member 760 travels along the lead-in chamfer 818 of the first splined member 712, it radially contracts the retaining member 760 into the second splined member retaining member groove 758 in the second splined member 740. It is therefore to be understood that the lead-in chamfer 818 aids in making the assembly of the first splined member 712 into the second splined member 740 quicker and easier.

Additionally, as best seen FIG. 5A of the disclosure and as a non-limiting example, the first splined member 712 includes a transition portion 754 that connects the second receiving portion 730 to the third receiving portion 732 of the first splined member 712. The transition portion 754 of the first splined member has a diameter that increases from the second receiving portion 730 to the third receiving portion 732 of the first splined member 712. It is to be understood that the transition portion 754 of the first splined member 712 may act as a lead-in chamfer in order to further aid in making the assembly of the second splined member 740 into the first splined member 712 quicker and easier.

Figure 6A:
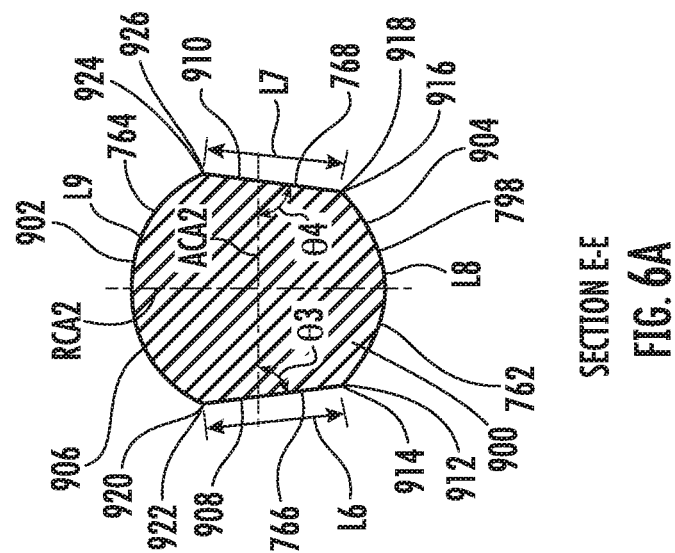
FIG. 6A is a schematic cross-sectional view of a portion of a body portion of the retaining member illustrated in FIG. 6 according to an embodiment of the disclosure.
Figure 6:
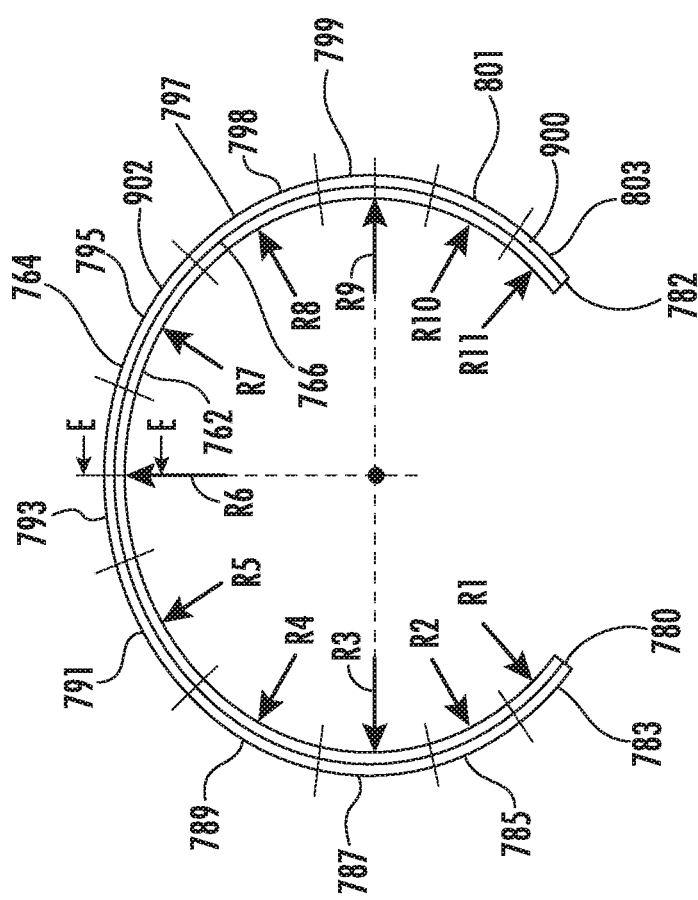
FIG. 6 is a schematic side-view of the retaining member illustrated in FIGS. 5-5E according to an alternative embodiment of the disclosure.

FIGS. 6 and 6A provide a schematic illustration of a retaining member 900 according to an alternative embodiment of the disclosure. The retaining member 900 illustrated in FIGS. 6 and 6A is the same as the retaining member 760 illustrated in FIGS. 5-5E, except where specifically noted below. As illustrated in FIGS. 6 and 6A of the disclosure and as a non-limiting example, the retaining member 900 has a body portion 902 described in more detail below. In accordance with the embodiment of the disclosure illustrated in FIG. 6 and as a non-limiting example, the innermost surface 762 of the body portion 902 of the retaining member 900 may have a shape that is substantially similar to that of the retaining member 760 illustrated in FIG. 5C. Additionally, in accordance with the embodiment of the disclosure illustrated in FIG. 6 and as a non-limiting example, the retaining member 900 may have a substantially ellipsoidal or a substantially circular shape. It is within the scope of this disclosure and as a non-limiting example that the retaining member 900 may be a snap-ring, a circlip, a seeger ring, a C-clip or a Jesus clip.

FIG. 6A of the disclosure provides a schematic cross-sectional view of a portion of the body portion 902 of the retaining member 900 along the line E-E illustrated in FIG. 6. In accordance with the embodiment of the disclosure illustrated in FIG. 6A and as a non-limiting example, the innermost surface 762 of the body portion 902 of the retaining member 900 may include a first arcuate portion 904 and the outermost surface 764 of the body portion 902 may include a second arcuate portion 906. Additionally, the first side 766 of the body portion 902 of the retaining member 900 may include a first substantially flat portion 908 and the second side 768 of the body portion 902 may include a second substantially flat portion 910. As best seen in FIG. 6A of the disclosure and as a non-limiting example, the first arcuate portion 904 of the retaining member 900 may have a first end 912 directly connected to a first end 914 of the first substantially flat portion 908 and a second end 916 directly connected to a first end 918 of the second substantially flat portion 910 of the retaining member 900. Additionally, as best seen in FIG. 6A of the disclosure and as a non-limiting example, a first end 920 of the second substantially arcuate portion 902 may be directly connected to a second end 922 of the first substantially flat portion 908 of the retaining member 900 and a second end 924 may be directly connected to a second end 926 of the second substantially flat portion 910 of the retaining member 900. As a result, it is therefore to be understood that the ends of the first arcuate portion 904 of the body portion 902 of the retaining member 900 may be directly connected to the ends of the first and second substantially flat portions 908 and 910 opposite the second arcuate portion 902 of the retaining member 900. The first and second substantially flat portions 908 and 910 of the body portion 902 of the retaining member 900 therefore bilaterally truncate the body portion 902 of the retaining member 900 of the quick connect assembly 702.

In accordance with the embodiment of the disclosure illustrated in FIG. 6A and as a non-limiting example, the first substantially flat portion 908 of the retaining member 900 may extend at an angle θ3 relative to an axial center-line axis ACA2 of the body portion 902 of the retaining member 900. Additionally, according to the embodiment illustrated in FIG. 6A of the disclosure and as a non-limiting example, the second substantially flat portion 910 of the retaining member 900 may extend at an angle θ4 relative to the axial center-line ACA2 of the body portion 902 of the retaining member 90. It is within the scope of this disclosure and as a non-limiting example that the first and second substantially flat portions 908 and 910 of the retaining member 900 may extend at angles θ3 and θ4 toward a radial center-line axis RCA2 of the body portion 902 of the retaining member 900. As a result, it is to be understood that the first and second substantially flat portions 908 and 910 of the body portion 902 of the retaining member 900 are non-parallel to each other and provide a retaining member 900 with a body portion 902 having a substantially trapezoidal cross-sectional shape.

The first substantially flat portion 908 of the body portion 902 of the retaining member 900 has a length L6, the second substantially flat portion 910 has a length L7, the first arcuate portion 904 has a circumferential length L8 and the second arcuate portion 906 has a circumferential length L9. It is within the scope of this disclosure and as a non-limiting example that the lengths L6 and L7 of the first and second substantially flat portions 908 and 910 of the retaining member 900 may be substantially equal to each other. Additionally, it is within the scope of this disclosure and as a non-limiting example that the circumferential length L8 of the first arcuate portion 904 may be less than the circumferential length L9 of the second arcuate portion 906 of the body portion 902 of the retaining member 900 of the quick connect assembly 702.

It is within the scope of this disclosure and as a non-limiting example that the retaining member 900 may be used in place of the retaining member 760 of the quick connect assembly 702 illustrated in FIGS. 5-5E of the disclosure. As a result, when the quick connect assembly 702 is assembled, at least a portion of the retaining member 900 is received and/or retained within at least a portion of the first splined member retaining member groove 738 and the second splined member retaining member groove 758 of the first and second splined member 712 and 760. By providing a retaining member 900 with first and second substantially flat portions 908 and 910 that are disposed at angles θ3 and θ4, it aids in facilitating the retraction of the retaining member 900 within the first splined member retaining member grove 758 of the first splined member 712 during assembly. As a result, it is to be understood that the shape of the retaining member 900 aids in providing a quick connect assembly 702 that is easy to be assembled.

The retaining member 900 described and illustrated herein, is also less susceptible and therefore less sensitive to natural manufacturing variations inherent in the manufacturing of the various components of the quick connect assembly 702. It is within the scope of this disclosure and as a non-limiting example that the retaining member 900 may be heat treated by using one or more heat treating processes, hardened by using one or more hardening processes, and/or austempered. Additionally, it is to be understood that the geometry of the retaining member 900 aids in reducing the overall amount of force needed to assemble and dis-assemble the first splined member 712 from the second splined member 740 of the quick connect assembly 702. As a result, it is within the scope of this disclosure and as a non-limiting example that the retaining member 900 may be made, from a metallic material, a spring metal, a plastic material composition, a thermoplastic material composition, a Nylon material composition, a plastic acrylic material composition, an acrylonitrile butadiene styrene material composition, a polymeric material composition, a polycarbonate material composition, a polystyrene material composition or a polyoxymethylene material composition.

FIGS. 7 and 7A provide a schematic illustration of a retaining member 1000 according to an alternative embodiment of the disclosure. The retaining member 1000 illustrated in FIGS. 7 and 7A is the same as the retaining members 760 and 900 illustrated in FIGS. 5-6A, except where specifically noted below. As illustrated in FIGS. 7 and 7A of the disclosure and as a non-limiting example, the retaining member 1000 has a body portion 1002 described in more detail below. In accordance with the embodiment of the disclosure illustrated in FIG. 7 and as a non-limiting example, the innermost surface 762 of the body portion 1002 of the retaining member 1000 may have a shape that is substantially similar to that of the retaining member 760 illustrated in FIG. 5C. Additionally, in accordance with the embodiment of the disclosure illustrated in FIG. 7 and as a non-limiting example, the retaining member 1000 may have a substantially ellipsoidal or a substantially circular shape. It is within the scope of this disclosure and as a non-limiting example that the retaining member 1000 may be a snap-ring, a circlip, a seeger ring, a C-clip or a Jesus clip.

FIG. 7A of the disclosure provides a schematic cross-sectional view of a portion of the body portion 1002 of the retaining member 1000 along the line F-F illustrated in FIG. 7. In accordance with the embodiment of the disclosure illustrated in FIG. 7A and as a non-limiting example, the innermost surface 762 of the body portion 1002 of the retaining member 1000 may include a first arcuate portion 1004 and the outermost surface 764 of the body portion 1002 may include a second arcuate portion 1006. Additionally, the first side 766 of the body portion 1002 of the retaining member 1000 may include a first substantially flat portion 1008 and the second side 768 of the body portion 1002 may include a second substantially flat portion 1010. As best seen in FIG. 7A of the disclosure and as a non-limiting example, a first end 1012 of the first arcuate portion 1004 may be directly connected to a first end 1014 of the first substantially flat portion 1008 of the retaining member 1000 and a second end 1016 may be directly connected to a first end 1018 of the second substantially flat portion 1010 of the retaining member 1000. Additionally, as best seen in FIG. 7A of the disclosure and as a non-limiting example, a first end 1020 of the second arcuate portion 1006 may be directly connected to a second end 1022 of the first substantially flat portion 1008 of the retaining member 1000 and a second end 1024 of the second arcuate portion 1006 may be directly connected to a second end 1026 of the second substantially flat portion 1010 of the retaining member 1000. As a result, it is therefore to be understood that the ends of the first arcuate portion 1004 of the body portion 1002 of the retaining member 1000 may be directly connected to the ends of the first and second substantially flat portions 1008 and 1010 opposite the second arcuate portion 1006 of the retaining member 1000. The first and second substantially flat portions 1008 and 1010 of the body portion 1002 of the retaining member 1000 therefore bilaterally truncate the body portion 1002 of the retaining member 1000 of the quick connect assembly 702.

In accordance with the embodiment of the disclosure illustrated in FIG. 7A and as a non-limiting example, the first substantially flat portion 1008 of the retaining member 1000 may be substantially parallel to the second substantially flat portion 1010 of the retaining member 1000. As a result, it is to be understood that the body portion 1002 of the retaining member 1000 may have a substantially squircle cross-sectional shape.

The first substantially flat portion 1008 of the body portion 1002 of the retaining member 1000 has a length L10, the second substantially flat portion 1010 has a length L11, the first arcuate portion 1004 has a circumferential length L12 and the second arcuate portion 1006 has a circumferential length L13. It is within the scope of this disclosure and as a non-limiting example that the lengths L10 and L11 of the first and second substantially flat portions 1008 and 1010 of the retaining member 1000 may be substantially equal to each other. Additionally, it is within the scope of this disclosure and as a non-limiting example that the circumferential length L12 of the first arcuate portion 1004 may be substantially equal to the circumferential length L13 of the second arcuate portion 1006 of the body portion 1002 of the retaining member 1000 of the quick connect assembly 702.

It is within the scope of this disclosure and as a non-limiting example that the retaining member 1000 may be used in place of the retaining members 760 and 900 of the quick connect assembly 702 illustrated in FIGS. 5-6A of the disclosure. As a result, when the quick connect assembly 702 is assembled, at least a portion of the retaining member 1000 is received and/or retained within at least a portion of the first splined member retaining member groove 738 and the second splined member retaining member groove 758 of the first and second splined member 712 and 760. By providing a retaining member 1000 with first and second substantially flat portions 1008 and 1010 that are substantially parallel to each other, aids in preventing the outer surface 798 of the retaining member 1000 from "binding-up" with the first splined member retaining member groove 758 in the first splined member 740. It is therefore to be understood that the shape of the body portion 1002 of the retaining member 1000 aids in preventing the outer surface 798 of the retaining member 1000 from contacting and therefore "binding-up" with the corner 800 of the first splined member retaining member groove 758 in the second splined member 740. As a result, it is to be understood that the shape of the retaining member 900 aids in providing a quick connect assembly 702 that is easy to be assembled and dis-assembled.

The retaining member 1000 described and illustrated herein, is also less susceptible and therefore less sensitive to natural manufacturing variations inherent in the manufacturing of the various components of the quick connect assembly 702. It is within the scope of this disclosure and as a non-limiting example that the retaining member 1000 may be heat treated by using one or more heat treating processes, hardened by using one or more hardening processes, and/or austempered. Additionally, it is to be understood that the geometry of the retaining member 1000 aids in reducing the overall amount of force needed to assemble and dis-assemble the first splined member 712 from the second splined member 740 of the quick connect assembly 702. As a result, it is within the scope of this disclosure and as a non-limiting example that the retaining member 1000 may be made from a metallic material, a spring metal, a plastic material composition, a thermoplastic material composition, a Nylon material composition, a plastic acrylic material composition, an acrylonitrile butadiene styrene material composition, a polymeric material composition, a polycarbonate material composition, a polystyrene material composition or a polyoxymethylene material composition.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A quick connect assembly, comprising:
a first splined member;
wherein a first splined member retaining member groove circumferentially extends along at least a portion of an inner surface of said first splined member;
a second splined member;
wherein a second splined member retaining member groove circumferentially extends along at least a portion of an outer surface of said second splined member;
wherein the first splined member retaining groove is both at least partially axially offset from and at least partially overlapping with said second splined member retaining groove to provide a gap between said outermost surface adjacent the first side of the first splined member retaining member groove and the second splined member retaining member groove,
a retaining member;
wherein an innermost surface of a body portion of said retaining member has a first arcuate portion having a first end and a second end;
wherein an outermost surface of said body portion of said retaining member has a second arcuate portion having a first end and a second end;
wherein a first side of said body portion of said retaining member has a first substantially flat portion having a first end and a second end and wherein a second side of said body portion of said retaining member has a second substantially flat portion having a first end and a second end;
wherein said first end of said first arcuate portion of said body portion of said retaining member is directly connected to said first end of said first substantially flat portion of said retaining member and said second end of said first arcuate portion is directly connected to a first end of said second substantially flat portion of said retaining member;
wherein said first end of said second arcuate portion of said body portion of said retaining member is directly connected to said second end of said first substantially flat portion of said retaining member and said second end of said arcuate portion is directly connected to a second end of said second substantially flat portion of said retaining member; and
wherein at least a portion of said retaining member is received and/or retained within at least a portion of said first splined member retaining member groove and said second splined member retaining member groove.

2. The quick connect assembly of claim 1, wherein said first splined member retaining member groove has a first end portion and a second end portion;
wherein said second end portion of said first splined member retaining member groove has a decreasing diameter portion having a first end and as second end; and
wherein said decreasing diameter portion of said first splined member retaining member groove has a diameter that decreases from said first end to said second end of said decreasing diameter portion.

3. The quick connect assembly of claim 1, wherein said second splined member further comprises a second splined member sealing member groove;
wherein said second splined member sealing member groove circumferentially extends along at least a portion of said outer surface of said second reduced diameter portion of said second splined member;
wherein said second splined member sealing member groove is disposed directly adjacent to said second splined member retaining member groove in said outer surface of said second splined member; and
wherein said second splined member sealing member groove is of a size and shape to receive and/or retain at least a portion of a second sealing member.

4. The quick connect assembly of claim 1, wherein said body portion of said retaining member has a plurality of interconnected radiused portions forming said body portion of said retaining member.

5. The quick connect assembly of claim 1, wherein said retaining member further comprises a first radiused portion, a second radiused portion, a third radiused portion, a fourth radiused portion, a fifth radiused portion, a sixth radiused portion, a seventh radiused portion, an eighth radiused portion, a ninth radiused portion, a tenth radiused portion and an eleventh radiused portion;
wherein said first, second third, fourth, fifth, sixth, seventh, eighth, ninth, tenth and eleventh radiused portions are interconnected forming said body portion of said retaining member;
wherein said first, second, third, fourth, fifth, sixth, seventh, eighth, ninth, tenth and 11 radiused portions of said retaining member have a radius R1, R2, R3, R4, R5, R6, R7, R8, R9, R10 and R11 respectively; and
wherein said radius R1 is substantially equal to said radius R11, said radius R2 is substantially equal to said radius R10, said radius R3 is substantially equal to said radius R9, said radius R4 is substantially equal to said radius R8, and said radius R5 is substantially equal to said radius R7.

6. The quick connect assembly of claim 1, wherein said first and second substantially flat portions of said body portion of said retaining member bilaterally truncate said body portion of said retaining member.

7. The quick connect assembly of claim 1, wherein said first substantially flat portion of said first side of said body portion of said retaining member is not parallel to said second substantially flat portion of said second side of said body portion of said retaining member.

8. The quick connect assembly of claim 1, wherein said first substantially flat portion of said first side of said body portion of said retaining member extends at an angle relative to an axial center-line axis ACA1 of said body portion of said retaining member toward a radial center-line axis RCA1 of said body portion of said retaining member providing a gap between a substantially vertical wall of the second splined member retaining member groove and an outer surface of said retaining member; and
wherein said second substantially flat portion of said second side of said body portion of said retaining member extends at an angle relative to said axial center-line axis ACA1 of said body portion of said retaining member toward said radial center-line axis RCA1 of said body portion of said retaining member.

9. The quick connect assembly of claim 8, wherein said angle that said first substantially flat portion of said retaining member extends is substantially equal to said angle that said second substantially flat portion of said retaining member extends.

10. The quick connect assembly of claim 1, wherein said first substantially flat portion of said retaining member has a length that is substantially equal to a length of said second substantially flat portion of said retaining member; and/or
  wherein said first arcuate portion of said retaining member has a length that is less than, greater than, or substantially equal to a length of said second arcuate portion of said retaining member.

11. The quick connect assembly of claim 1, wherein said body portion of said retaining member has a substantially trapezoidal cross-sectional shape or a substantially squircle cross-sectional shape.

12. A quick connect assembly, comprising:
  a first splined member having a first splined member retaining member groove;
  a second splined member having a second splined member retaining member groove;
  a retaining member, comprising:
  a body portion having an innermost surface, an outermost surface, a first side and a second side;
  wherein said innermost surface of said body portion of said retaining member has a first arcuate portion having a first end and a second end;
  wherein said outermost surface of said body portion of said retaining member has a second arcuate portion having a first end and a second end;
  wherein said first side of said body portion of said retaining member has a first substantially flat portion having a first end and a second end;
  wherein said second side of said body portion of said retaining member has a second substantially flat portion having a first end and a second end; and
  wherein said first end of said first arcuate portion of said body portion of said retaining member is directly connected to said first end of said first substantially flat portion of said retaining member and said second end of said first arcuate portion is directly connected to a first end of said second substantially flat portion of said retaining member; and
  wherein said first end of said second arcuate portion of said body portion of said retaining member is directly connected to said second end of said first substantially flat portion of said retaining member and said second end of said arcuate portion is directly connected to a second end of said second substantially flat portion of said retaining member,
  wherein said outermost surface adjacent the second side is in selective contact with a decreased diameter portion of the first splined member retaining member groove and a gap extends between said outermost surface adjacent the first side of the first splined member retaining member groove and the second splined member retaining member groove;
  wherein said first splined member retaining member groove is not symmetrical with said second splined member retaining member groove across an intersection of said first splined member and said second splined member.

13. The assembly of claim 12, wherein said first and second substantially flat portions of said body portion of said retaining member bilaterally truncate said body portion of said retaining member.

14. The assembly of claim 12, wherein said first substantially flat portion of said first side of said body portion of said retaining member is not parallel to said second substantially flat portion of said second side of said body portion of said retaining member.

15. The assembly of claim 12, wherein said first substantially flat portion of said first side of said body portion of said retaining member extends at an angle relative to an axial center-line axis ACA1 of said body portion of said retaining member toward a radial center-line axis RCA1 of said body portion of said retaining member; and
  wherein said second substantially flat portion of said second side of said body portion of said retaining member extends at an angle relative to said axial center-line axis ACA1 of said body portion of said retaining member toward said radial center-line axis RCA1 of said body portion of said retaining member.

16. The assembly of claim 15, wherein said angle that said first substantially flat portion of said retaining member extends is substantially equal to said angle that said second substantially flat portion of said retaining member extends.

17. The assembly of claim 12, wherein said first substantially flat portion of said retaining member has a length that is substantially equal to a length of said second substantially flat portion of said retaining member; and/or
  wherein said first arcuate portion of said retaining member has a length that is less than, greater than, or substantially equal to a length of said second arcuate portion of said retaining member.

18. The assembly of claim 12, wherein said body portion of said retaining member has a substantially trapezoidal cross-sectional shape or a substantially squircle cross-sectional shape.

19. The assembly of claim 12, wherein said body portion of said retaining member has a plurality of interconnected radiused portions forming said body portion of said retaining member.

20. The assembly of claim 12, wherein said retaining member further comprises a first radiused portion, a second radiused portion, a third radiused portion, a fourth radiused portion, a fifth radiused portion, a sixth radiused portion, a seventh radiused portion, an eighth radiused portion, a ninth radiused portion, a tenth radiused portion and an eleventh radiused portion;
  wherein said first, second third, fourth, fifth, sixth, seventh, eighth, ninth, tenth and eleventh radiused portions are interconnected forming said body portion of said retaining member;
  wherein said first, second, third, fourth, fifth, sixth, seventh, eighth, ninth, tenth and 11 radiused portions of said retaining member have a radius R1, R2, R3, R4, R5, R6, R7, R8, R9, R10 and R11 respectively;
  wherein said radius R1 is substantially equal to said radius R11, said radius R2 is substantially equal to said radius R10, said radius R3 is substantially equal to said radius R9, said radius R4 is substantially equal to said radius R8, and said radius R5 is substantially equal to said radius R7.

* * * * *